US012654575B2

(12) United States Patent (10) Patent No.: US 12,654,575 B2
Park et al. (45) Date of Patent: Jun. 16, 2026

(54) CHARGING DEVICE FOR PERSONAL MOBILITY MEANS

(71) Applicant: LG ELECTRONICS INC., Seoul (KR)

(72) Inventors: Hyunghoon Park, Seoul (KR); Samyoup Kim, Seoul (KR); Jong Kyu Ju, Seoul (KR); Sungpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 596 days.

(21) Appl. No.: 18/030,466

(22) PCT Filed: Feb. 4, 2021

(86) PCT No.: PCT/KR2021/001476
§ 371 (c)(1),
(2) Date: Apr. 5, 2023

(87) PCT Pub. No.: WO2022/075537
PCT Pub. Date: Apr. 14, 2022

(65) Prior Publication Data
US 2023/0382244 A1      Nov. 30, 2023

(30) Foreign Application Priority Data
Oct. 6, 2020      (KR) ........................ 10-2020-0128867

(51) Int. Cl.
B60L 53/122 (2019.01)
B62H 3/08 (2006.01)
B62H 5/00 (2006.01)

(52) U.S. Cl.
CPC .............. B60L 53/122 (2019.02); B62H 3/08 (2013.01); B60L 2200/12 (2013.01); B60L 2200/24 (2013.01); B62H 5/00 (2013.01)

(58) Field of Classification Search
CPC ........ B60L 53/122; B60L 53/12; B60L 53/38; B60L 53/24; B60L 53/36; B62H 3/08; H02J 7/0042; H02J 50/10; H01F 38/14
See application file for complete search history.

(56) References Cited

U.S. PATENT DOCUMENTS

2022/0396166 A1* 12/2022 Cucco ..................... B60L 53/38

FOREIGN PATENT DOCUMENTS

JP      2007-331726      12/2007
KR    10-2012-0020537      3/2012
(Continued)

OTHER PUBLICATIONS

Korean Intellectual Property Office Application No. 10-2020-0128867, Office Action dated May 7, 2025, 3 pages.
(Continued)

*Primary Examiner* — David V Henze-Gongola
(74) *Attorney, Agent, or Firm* — LEE, HONG, DEGERMAN, KANG & WAIMEY

(57) ABSTRACT

The present invention relates to a charging device for a personal mobility means. More specifically, the present invention may comprise support parts each having a slot in which a wheel of a personal mobility means is seated; a frame part connecting the support parts to each other; a first charging unit disposed in the frame part to generate a magnetic field for wireless charging toward the personal mobility means seated in the support parts; and a second charging unit mounted to the personal mobility means and converting the magnetic field, received via the first charging unit, into power to charge a battery provided in the personal mobility means.

18 Claims, 22 Drawing Sheets

(56)     References Cited

FOREIGN PATENT DOCUMENTS

| KR | 10-1614933 | 4/2016 | | |
| KR | 1020160065242 | 6/2016 | | |
| KR | 10-1764648 | 8/2017 | | |
| KR | 10-1952540 | 6/2019 | | |
| KR | 101952540 B1 * | 6/2019 | ............ | B62K 3/002 |
| KR | 10-2020-0026493 | 3/2020 | | |
| KR | 10-2020-0085964 | 7/2020 | | |

OTHER PUBLICATIONS

PCT International Application No. PCT/KR2021/001476, International Search Report dated Jul. 2, 2021, 5 pages.

\* cited by examiner

CHARGING DEVICE FOR PERSONAL MOBILITY MEANS

CROSS-REFERENCE TO RELATED APPLICATIONS

This application is the National Stage filing under 35 U.S.C. 371 of International Application No. PCT/KR2021/001476, filed on Feb. 4, 2021, which claims the benefit of earlier filing date and right of priority to Korean Application No. 10-2020-0128867, filed on Oct. 6, 2020, the contents of which are all incorporated by reference herein in their entirety.

TECHNICAL FIELD

The present disclosure relates to a charging device for a personal mobility vehicle that may store and charge a personal mobility vehicle at the same time.

BACKGROUND ART

In general, a personal mobility means or vehicle is a transportation means for one person that is powered by electricity, and such personal mobility vehicles may include electric wheels, electric kickboards, electric bicycles and micro electric vehicles.

An electric kickboard widely used as the personal mobility vehicle may include a body having a skate board shape, a support bar extending upward from the body, a handle extending from both sides of the support bar, and a wheel rotatably coupled to the body and the support bar.

Recently, a conventional personal mobility vehicle includes a motor supplying a rotational power and a battery supplying power to the motor.

Since the conventional personal mobility device is left on the street after being used, there is a problem in that the left personal mobility device could interfere with the movement of pedestrians and vehicles. In addition, since the personal mobility device could not be charged immediately after use, inconvenience in use has been increased. Due to that structure, there is a need for improving the conventional structure.

The background art of the present disclosure is disclosed in KP 10-2020-0085964 (published on Jul. 16, 2020, the title of the invention: ELECTRIC KICKBOARD)

DESCRIPTION OF DISCLOSURE

Technical Problems

Accordingly, one object of the present disclosure is to provide a charging system for personal mobility devices that may charge and standby with the end of use of the personal mobility device.

A further object of the present disclosure is to provide a charging system for personal mobility devices that may prevent safety accidents due to electric shock when charging personal mobility devices.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A charging device for personal mobility means including the same to solve the above-noted objects of the present disclosure may is characterized in that charging is performed in a state where the personal mobility means is mounted on a support part.

Specifically, in a state where a front wheel and a rear wheel of the personal mobility means are seated in a first support and a second support, respectively, a first charging unit disposed in a frame part transmits energy to a second charging unit disposed in the personal mobility means to charge the personal mobility means.

Further, the charging device for the personal mobility means may is characterized in that wireless charging may be performed between the first charging unit and the second charging unit, thereby facilitating stable charging of the personal mobility means.

Specifically, the first charging unit disposed in the frame part may form a magnetic field for wireless charging and the second charging unit disposed in the personal mobility means may receive the magnetic field to charge a battery, thereby preventing occurrence of safety accidents due to electric shock.

The charging device for the personal mobility means may include at least one of a support part, a frame part, a first charging unit, a second charging unit, a variable support part and a locking unit.

The support part may include a groove in which a wheel of the personal mobility means is seated. The support part may include a first support comprising a groove in which a first wheel of the personal mobility means is seated. The first support may include at least one of a first support groove, a first inclined guide, a restraining portion, a first mounting groove and a first sensing portion.

The first support groove may form a groove shape covering a lower area of the first wheel.

The first inclined guide may be disposed on one side of the first support groove and forming an inclined surface toward a lower area of the first support groove.

The retraining portion may be disposed on the other side of the first support groove and retraining movement of the first wheel by protruding upward.

The first sensing portion may be provided between the first inclined guide and the restricting portion, and configured to determine whether the first wheel is seated in the first support groove.

The support part may include a second support comprising a groove in which a second wheel of the personal mobility means is seated. The second support may include at least one of a second support groove, a second inclined portion, an entrance portion, a second mounting groove and a second sensing portion.

The second support groove may form a groove that guides movement of the second wheel. The second inclined guide may be disposed on the other side of the second support groove and forming an inclined surface toward an upper area from a lower area of the second support groove. The entrance portion may be provided on one side of the second support groove, with an opened shape.

A second sensing portion may be disposed between the second inclined guide and the entrance portion and configured to sense whether the second wheel is seated in the second support groove.

The frame part connecting the support part. The frame part may include a first frame protruding upward from an installation surface and covering an outer circumference of the first support. The frame part may include a second frame protruding upward from the installation surface and covering an outer circumference of the second support. The frame part may include a connection frame protruding upward from the installation surface and connecting the first frame and the second frame with each other.

A first charging unit may be disposed in the frame part, the first charging unit that generate a magnetic field for wireless charging toward the personal mobility means seated in the support part. The first charging unit may include a first housing secured to the frame part. The first charging unit may include a transmission controller disposed inside the first housing. The first charging unit may include a transmission coil disposed inside the first housing and connected with the transmission controller.

The first housing may include a first housing body secured to a first coupling groove provided in the frame part. The first housing may include a first core member secured to the first housing body, with the transmission controller interposed therebetween. The first housing may include a first cover member secured to the first core member, with the transmission coil interposed therebetween.

A second charging unit may be mounted to the personal mobility means, the second charging unit that charges a battery provided in the personal mobility means by converting the magnetic field transmitted from the first charging unit into electric power. The second charging unit may include a second housing secured to a lower area of the personal mobility means. The second charging unit may include a reception controller disposed inside the second housing. The second charging unit may include a reception coil disposed inside the second housing and connected with the reception controller.

The second housing may include a second housing body secured to a second coupling groove provided in a footrest of the personal mobility means. The second housing may include a second core member secured to the second housing body, with the reception controller interposed therebetween. The second housing may include a second cover member secured to the second core member, with the reception coil interposed therebetween.

A charging device for a personal mobility means according to an embodiment may include a locking unit rotatably coupled to the frame part and closing an entrance portion of the support part after the wheel is moved inside the support part. The locking unit may include a locking plate rotatably coupled to the frame part and closing the entrance portion due to rotation. The locking unit may include a cylinder having one side rotatably coupled to the frame part and the other side rotatably coupled to the locking plate, the cylinder having a length that is variable based on movement of a rod member.

Advantageous Effect

The charging device for the personal mobility means according to the present disclosure may perform the operation of mounting the personal mobility means in the support part and the operation of wirelessly charging the personal mobility means at the same time. Accordingly, the charging and mounting of the personal mobility device may be performed at the same time, thereby improving use convenience.

In addition, the charging device according to the present disclosure may use the wireless charging method to charge the battery, thereby preventing occurrence of safety accidents due to electric shock.

In addition, the charging device according to the present disclosure may mount the personal mobility means in the state of standing at the upright pose by inserting the wheel of the personal mobility means in the support part, thereby facilitating easy storing and returning of the personal mobility means.

Specific effects are described along with the above-described effects in the section of Detailed Description.

BRIEF DESCRIPTION OF DRAWINGS

FIG. 10 is a front view showing a state where a rear wheel of a personal mobility vehicle is introduced to a second support;

FIG. 11 is a front view showing a state where a rear wheel of a personal mobility vehicle according to an embodiment of the present disclosure moves over a connection frame;

FIG. 16 is a front view showing a state where a personal mobility vehicle is seated on a support part after riding over a locking unit;

FIG. 17 is a view showing a state where a locking unit according to an embodiment of the present disclosure is operated to restrict movement of a personal mobility vehicle;

DESCRIPTION OF SPECIFIC EMBODIMENTS

Figure 1:
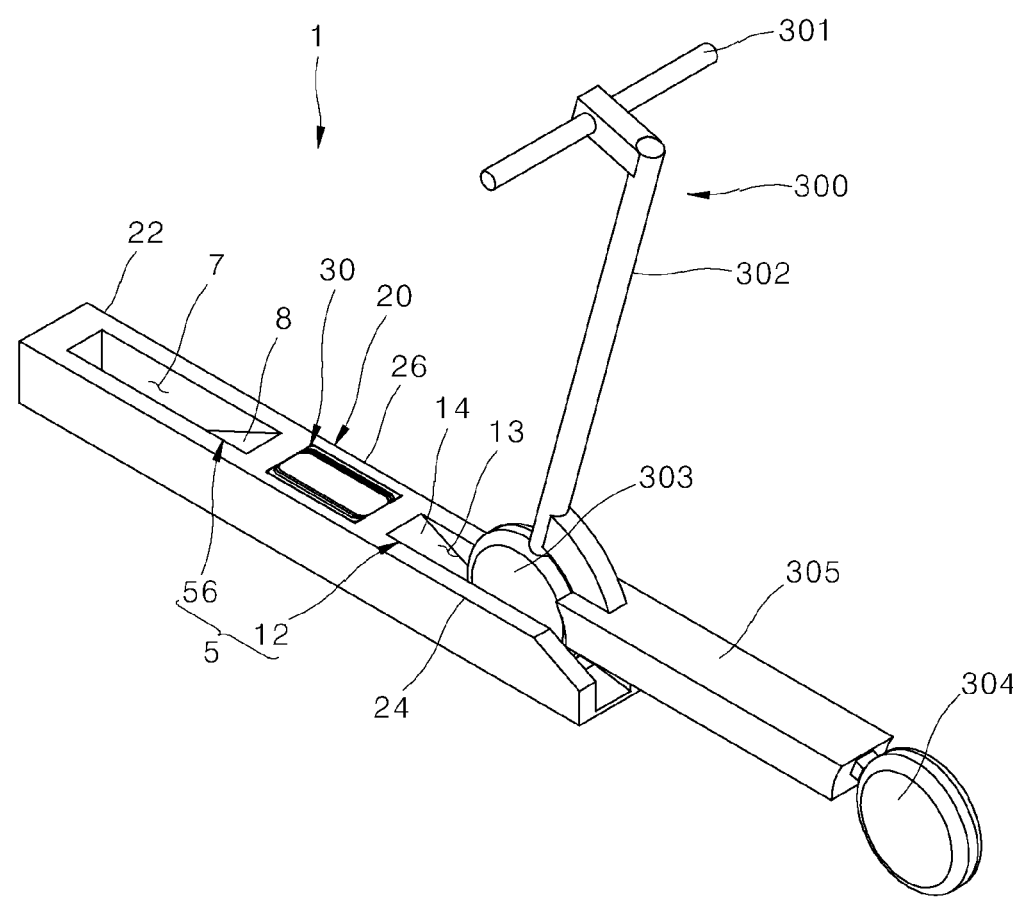
FIG. 1 is a perspective view showing a state where a charging device for a personal mobility vehicle according to an embodiment of the present disclosure is installed.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
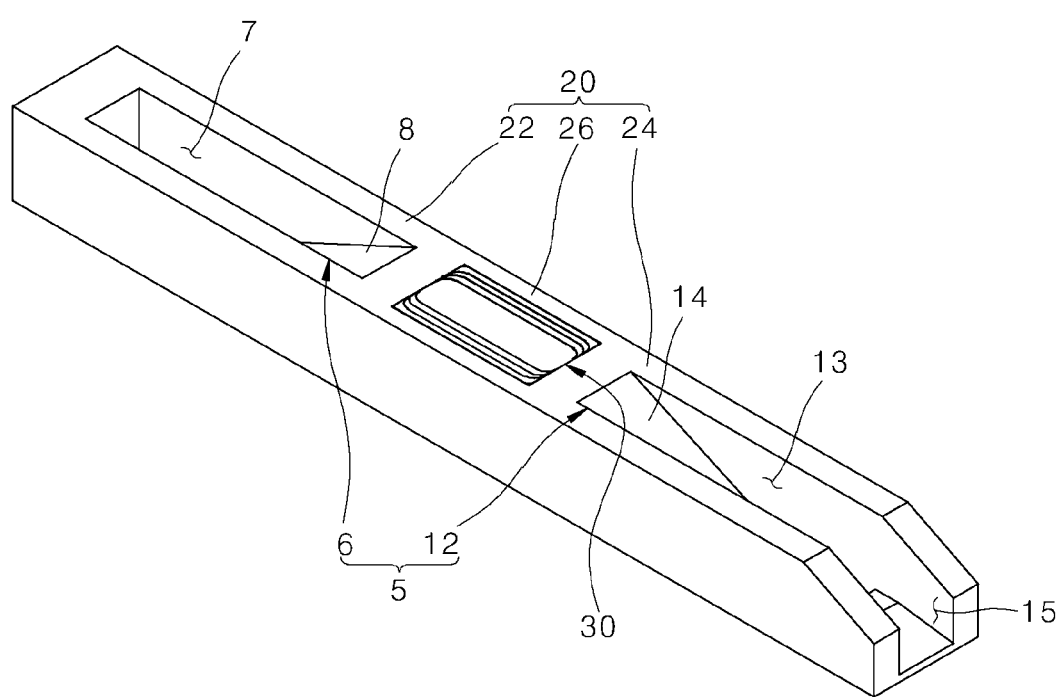
FIG. 2 is a perspective view showing a state where a first charging unit according to an embodiment is mounted to a frame unit.

FIG. 1 is a perspective view showing a state where a charging device 1 for a personal mobility vehicle according to an embodiment of the present disclosure is installed. FIG. 2 is a perspective view showing a state where a first charging unit according to an embodiment is mounted to a frame unit 20.

As shown in FIGS. 1 and 2, the charging device 1 for a personal mobility vehicle may include at least one of a support part 5, a frame part 20, a first charging unit 30, a second charging unit 70, a variable support part 120, a locking unit 400 and a control unit 500

The charging device 1 for a personal mobility vehicle according to the present disclosure may be charged in a state where the personal mobility means (or vehicle) is mounted on the support part 5. Since the return and charging of the personal mobility vehicle 300 are performed simultaneously, use convenience of the personal mobility vehicle may be improved.

The support part 5 may be modified in various embodiments within a technical feature of including a groove in which a wheel of the personal mobility vehicle 300 is seated. The support part 5 according to an embodiment of the present disclosure may include a first support 6 and a second support 12.

Figure 3:
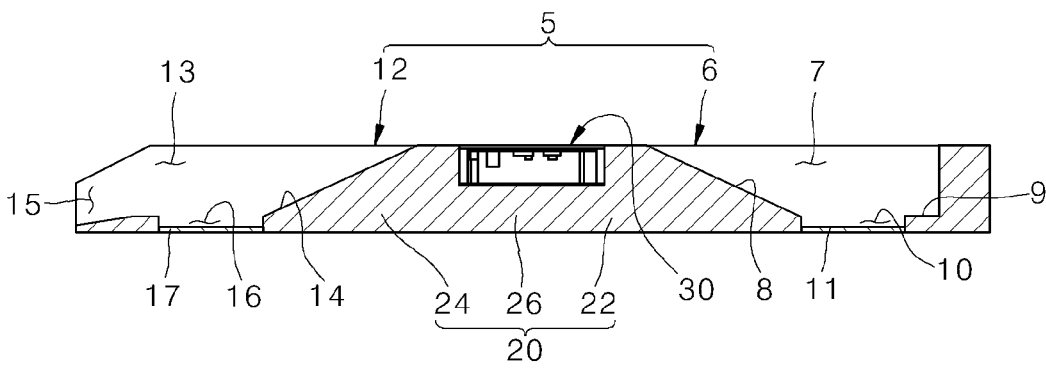
FIG. 3 is a sectional view showing a state where a first charging unit according to an embodiment is mounted to a frame part.
Figure 4:
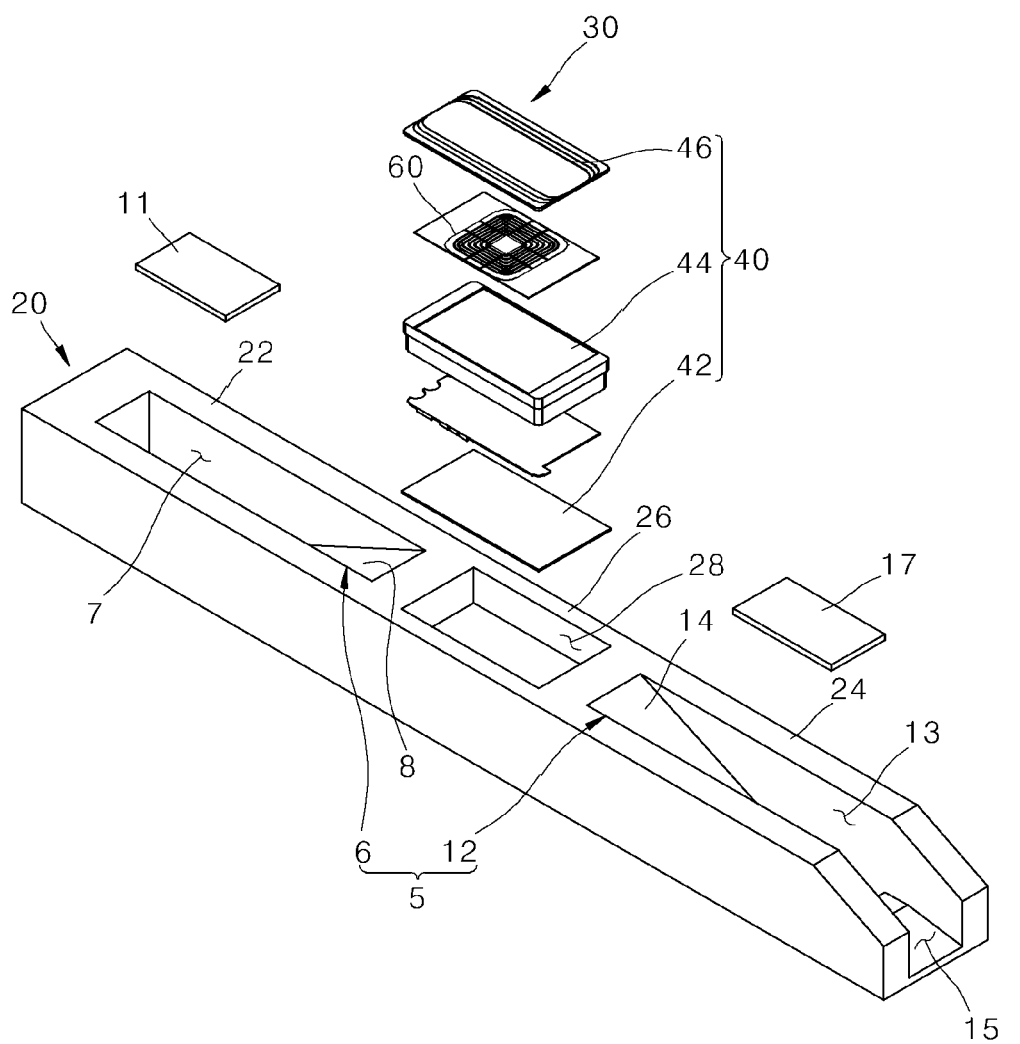
FIG. 4 is an exploded perspective view of a first charging unit according to an embodiment of the present disclosure.

FIG. 3 is a sectional view showing a state where a first charging unit 30 according to an embodiment is mounted to a frame par 20*t*. FIG. 4 is an exploded perspective view of a first charging unit 30 according to an embodiment of the present disclosure.

As shown in FIGS. 3 and 4, the first support 6 may be modified in various embodiments within a technical feature of forming a groove on the frame part 20 to seat a first wheel of the personal mobility vehicle 300 thereon. The first support 6 according to the embodiment may include at least one of a first support groove 7, a first inclined guide portion 8, a restraining portion 9, a first mounting groove 10 and a first sensing portion 11.

The first support groove 7 may have a groove shape covering a lower area of the first wheel. The first support groove 7 may be provided inside the frame part 20 and form a recessed area with an open top. The first support groove 7 may form a concave groove upward so that a first wheel may be inserted into the first support groove 7 to maintain an upright state.

The first inclined guide portion 8 may be provided in one side (i.e., a left side with respect to FIG. 3) of the first support groove 7 and form an inclined surface toward a lower area of the first support groove 7. Accordingly, the first wheel after passing through the second support 12 and the connection frame 26 in order may be moved downward along the first inclined guide portion 8 to be seated on a first mounting groove 10.

The restraining portion 9 may be provided on the other side (i.e., a left side with respect to FIG. 3) of the first support groove 7, and protrude upward to restrain the movement of the first wheel. The first mounting groove having a concave groove shape may be provided between the restraining groove 10 and the first inclined guide portion 8. Accordingly, a lower area of the first wheel disposed between the first inclined guide portion 8 and the restraining portion 9 may be inserted in the first mounting groove 10 so that the movement of the first wheel can be restrained.

The first sensing portion 11 may be provided between the first inclined guide portion 8 and the restraining portion 9, and may be modified in various embodiments within a technical feather of determining whether the first wheel is located inside the first support groove 7 and transmitting a measured value to the control unit 500. A first sensing portion 11 according to an embodiment may be provided inside the first mounting groove 10 and configured to detect contact of the first wheel and transmit a detected value to the control unit 500. The first sensing portion 11 may detect the first wheel in a contact method, and may detect whether the first wheel is seated or not in a non-contact method such as light irradiation if necessary.

The second support 12 may be modified in various embodiments within a technical feature of forming a groove to receive a second wheel of the personal mobility vehicle 300 on the frame part 20. The second support 12 according to an embodiment may include at least one of a second support groove 13, a second inclined guide portion 14, an entrance portion 15, a second mounting groove 16 and a second sensing portion 17.

The second support groove 13 may have a groove shape covering a lower area of the second wheel. The second support groove 13 may be provided inside the frame part 20. One side of the second support groove 13 may form the entrance portion 15 that is an apace in communication with the outside of the frame part 20.

The entrance portion 15 may be modified in various embodiments within a technical feature of forming an open shape on one side of the second support groove 13. Accordingly, the second wheel may be moved to the inside of the second support groove 13 through the entrance portion 15. Since the second support groove 13 may form a concave groove upward, with an open top the second wheel may be inserted in the second support groove 13 to maintain an upright state.

The second inclined guide portion 14 may be provided on the other side (i.e., the right side with respect to FIG. 3) and form an inclined surface toward the top from the bottom of the second support groove 13. Accordingly, the second wheel moved into the second support groove 13 through the entrance portion 15 may be moved upward along the second inclined guide 14 to be moved toward the first support 6.

A second mounting 16 that is a concave groove shape may be provided between the entrance portion 15 and the second inclined guide portion 14. Accordingly, the lower area of the second wheel disposed between the entrance portion 15 and the second inclined guide portion 14 may be inserted in the second mounting groove 16 so that the movement of the second wheel can be restrained.

The second sensing portion 17 may be provided between the second inclined guide portion 14 and the entrance portion 15, and may be modified in various embodiments within a technical feather of determining whether the second wheel is located inside the second support groove 13 and transmitting a measured value to the control unit 500. A second sensing portion 17 according to an embodiment may be provided inside the second mounting groove 16 and configured to detect contact of the second wheel and transmit a detected value to the control unit 500. The second sensing portion 17 may detect the second wheel in a contact method, and may detect whether the second wheel is seated or not in a non-contact method such as light irradiation if necessary.

The first wheel according to an embodiment of the present disclosure may be a front wheel 303 of the personal mobility vehicle and the second wheel may be a rear wheel 304 of the personal mobility vehicle. However, if necessary, the first wheel may be the rear wheel 304 of the personal mobility vehicle and the second wheel may be the front wheel thereof.

The frame part 20 may be modified in various embodiments within a technical feature of connecting the support part 5 include the first support 6 and the second support 12. The frame part 20 according to an embodiment may include a first frame 22, a second frame 24, and a connection frame 26.

The first frame 22 may protrude upward from an installation surface while surrounding an outer circumference of the first support 6. The first frame 22 and the first support 6 may be integrally formed as one body. If necessary, they may be separable.

The second frame 24 may protrude upward from the installation surface while surrounding an outer circumference of the second support 12. One side of the second frame 24 may have an open shape like the entrance portion 15 provided on side of the second support 12.

The connection frame 26 may be modified in various embodiments within a technical feature of connecting the first frame 22 and the second frame 24 with each other and supporting the first charging unit 30. A first coupling groove 28 having a concave groove shape may be provided on an upper surface of the connection frame 26 so that the first charging unit 30 may be installed in a state of being inserted in the first mounting groove 28.

Meanwhile, the support part 5 and the frame part 20 may be separately fabricated and then coupled to each other. The support part 5 may be separately customized based on the shape of the personal mobility vehicle 300. Since the support 5 separately fabricated for each model of the personal mobility vehicle 300 is coupled to the frame part 20 and the frame part 20 is used in common, production costs may be reduced. In this instance, an operation method not of not operating normally in other products than the designated personal mobility vehicles 300 may be provided.

Figure 15:
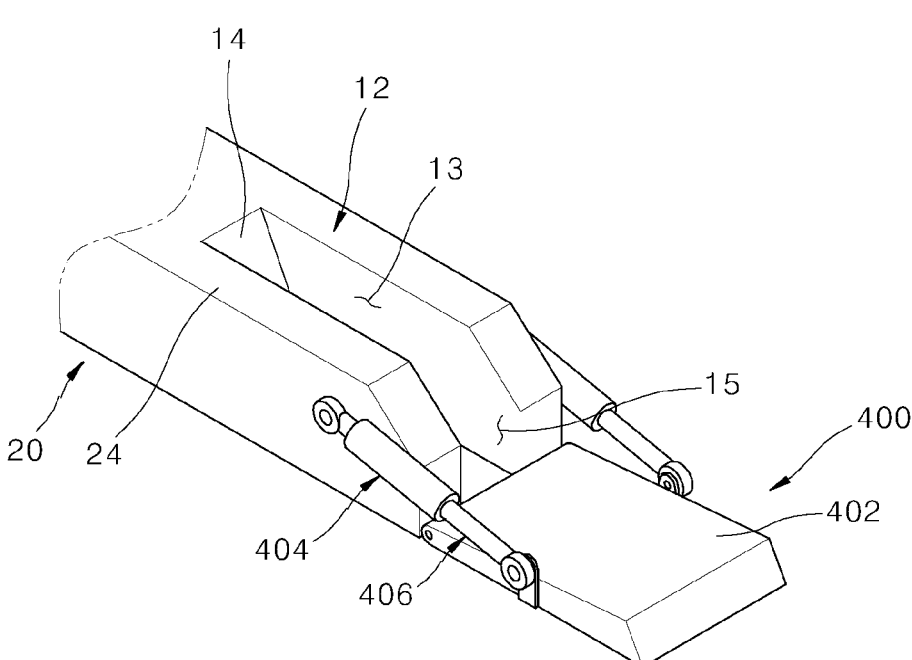
FIG. 15 is a perspective view showing a locking unit according to an embodiment of the present disclosure.

FIG. 15 is a perspective view showing a locking unit 400 according to an embodiment of the present disclosure. As shown in FIG. 15, the charging device 1 for a personal mobility vehicle may include the locking unit 400.

The locking unit 400 may be modified in various embodiments within a technical feature of being rotatably coupled to the frame part 20 and closing the entrance portion 15 of the support part 5 after the wheel is moved into the support part 5. The locking unit 400 according to an embodiment of the present disclosure may include a locking plate 402, a cylinder 404 and a rod member 406.

The locking plate 402 may be modified in various embodiments within a technical feature of being rotatably coupled to the frame part 20 and closing the entrance portion 15 through the rotation. The locking plate 402 according to an embodiment may have a plate shape and be rotatably coupled to the second frame 24. Accordingly, the entrance portion 15 of the second support 12 may be open and closed by the operation of the locking plate 402.

The cylinder 404 may have one side rotatably coupled to the frame part 20 and the other side rotatably coupled to the locking plate 402. The length of the cylinder 404 may be changeable by the movement of the rod member 406. The cylinder 404 may be operated by supplying hydraulic pressure or pneumatic pressure to rotate the locking plate 402.

As shown in FIGS. 2 and 4, the first charging unit 30 may be modified in various embodiments within a technical feature of generating a magnetic field for wireless charging toward the personal mobility vehicle 300 mounted on the support part 5, while being disposed in the frame part 20. The first charging unit 30 according to an embodiment of the present disclosure may include at least one of a first housing 40, a transmission controller 50 and a transmission coil 60.

The magnetic field for wireless charging generated in the first charging unit 30 may be transmitted to the second charging unit 70 disposed in the personal mobility vehicle 300, and may charge a battery 307 embedded in the personal mobility vehicle 300, thereby preventing occurrence of safety accidents due to electric shock. In addition, the first charging unit 30 may be disposed in a state of being fixedly coupled to the connection frame 26.

The first housing 40 may be secured to the frame part 20 and molded of a non-metal or non-magnetic material to block electricity from moving from the inside of the first housing 40 to the frame part 20. The first housing 40 may be formed of a plurality of members as necessary. The first housing 40 according to an embodiment of the present disclosure may include a first housing body 42, a first core member 44 and a first cover member 46.

The first housing body 42 may be secured to a first coupling groove 28 provided in the frame part 20. The first housing body 42 may have a plate shape and secured to the first coupling groove 28 if necessary. The first housing body 42 may be molded of a material including an aluminum alloy with high thermal conductivity for heat radiation or an insulation material such as plastic.

The first core member 44 may be secured to the first housing body 42, with the transmission controller 50 therebetween. The first core member 44 may include an aluminum alloy for heat radiation and may be molded of a material with high thermal conductivity. The first core member 44 may be disposed between the transmission controller 50 and the transmission coil 60, and may serve as a partition wall for blocking the magnetic field generated in the transmission coil 60 from being transmitted to the transmission controller 50.

The transmission coil 60 may be disposed between the first cover member 46 and the first core member 44, and the first cover member 46 may be coupled to the outside of the first core member 44. The first cover member 46 may be molded of plastic and function to cover the transmission coil 60 from being exposed outside.

The transmission controller 50 may be disposed inside the first housing 40. The transmission controller 50 may include a control element configured to form a magnetic field by supplying power to the transmission coil 60. The transmission controller 50 may be formed by mounting a control element on a printed circuit board.

The transmission coil 60 may be disposed inside the first housing 40 and connected with the transmission controller 50. The first core member 44 may be provided between the transmission coil 60 and the transmission controller 50. A cable supplied power may be spirally wound. The transmission coil 60 may generate a magnetic field for charging upward to the second charging unit 70. The transmission coil 60 may be secured to a plate-shaped member to maintain the wound shape.

Figure 5:
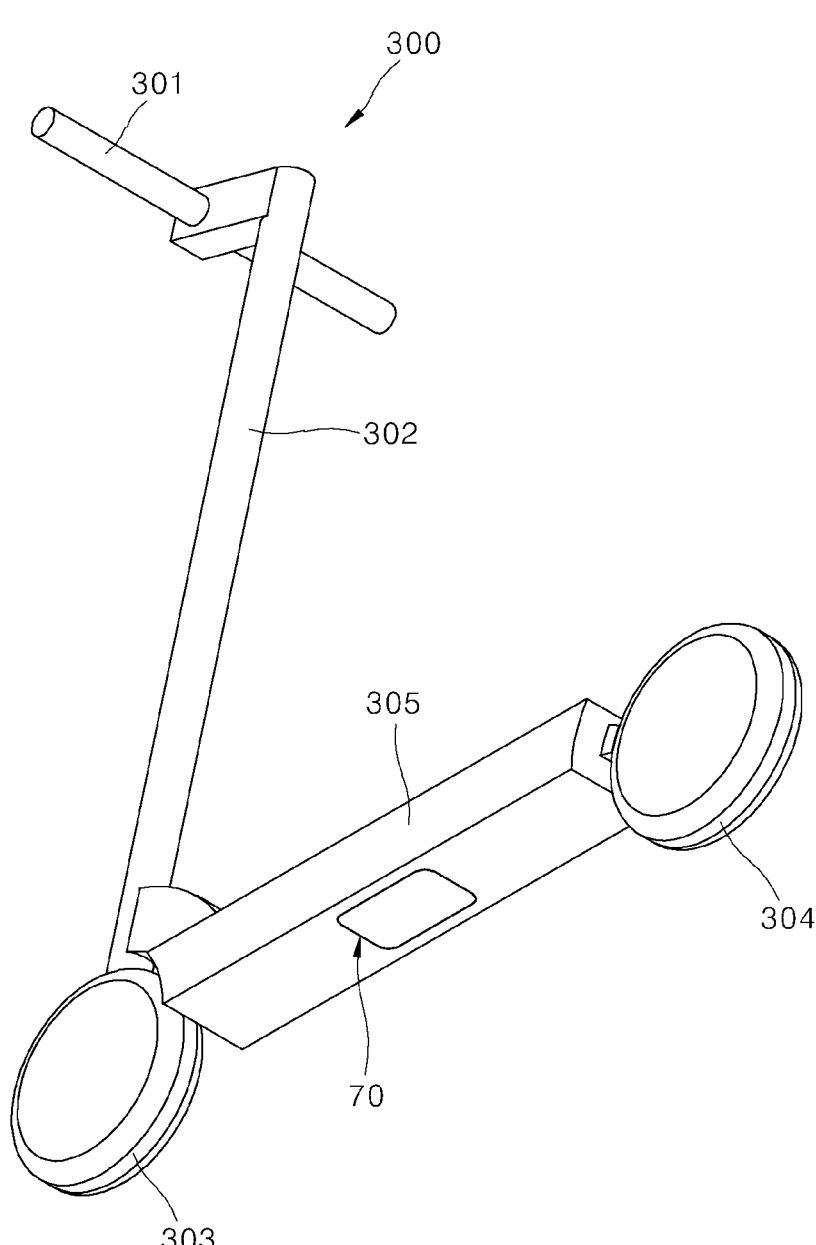
FIG. 5 is a perspective view showing a state where a second charging unit according to an embodiment of the present disclosure is mounted to a footrest of a personal mobility vehicle.
Figure 6:
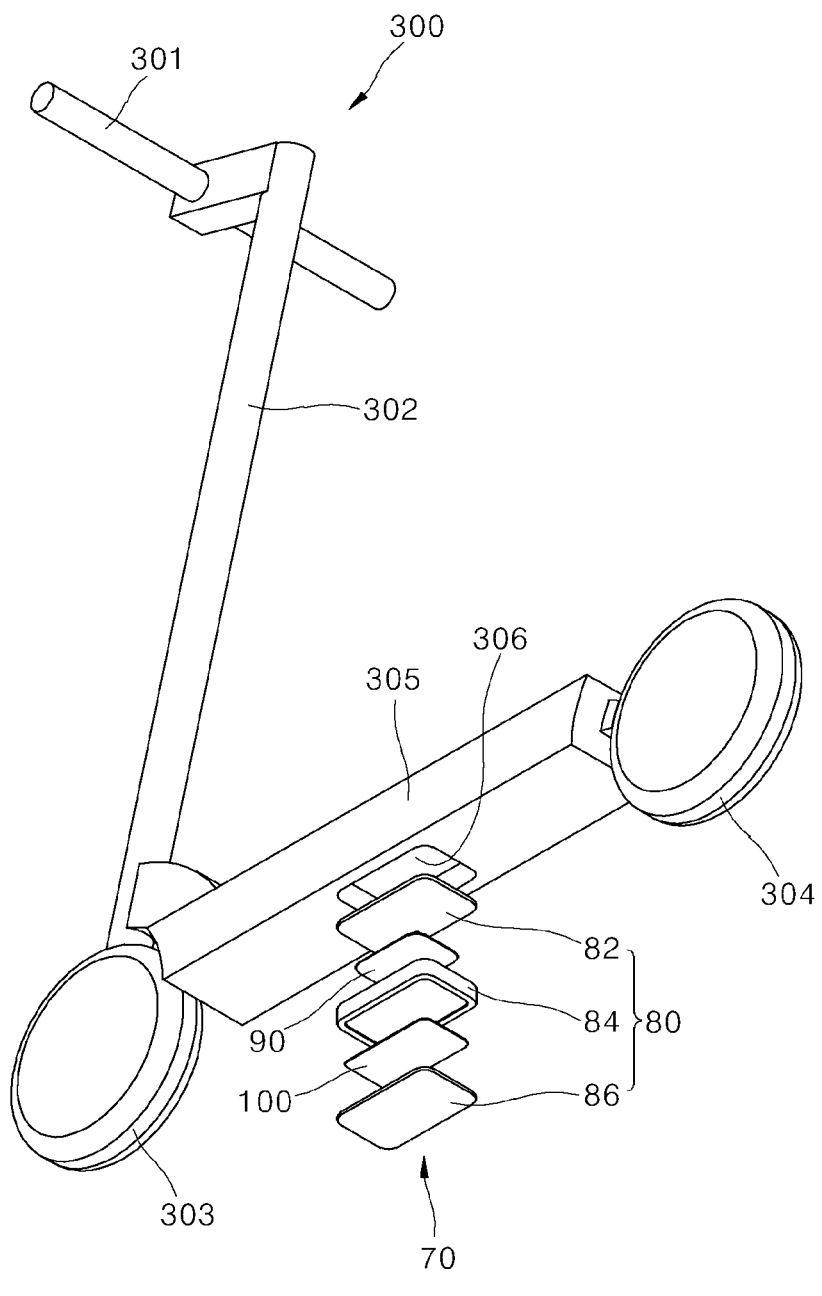
FIG. 6 is an exploded perspective view of a second charging unit according to an embodiment of the present disclosure.

FIG. 5 is a perspective view showing a state where a second charging unit 70 according to an embodiment of the present disclosure is mounted to a footrest 305 of a personal mobility vehicle 300. FIG. 6 is an exploded perspective view of a second charging unit 70 according to an embodiment of the present disclosure.

As shown in FIGS. 5 and 6, the second charging unit 70 may include a receiver configured to receive wireless electricity, and may be secured to the personal mobility vehicle 300, thereby reducing initial installation costs. The second charging unit 70 according to an embodiment may be detachably coupled to a lower lateral surface of the footrest 305.

The second charging unit 70 may be mounted to the personal mobility vehicle 300 and may be modified in various embodiments within a technical feature of charging a battery 307 provided in the personal mobility vehicle 300 by converting the magnetic field transmitted from the first charging unit 30 into electric power. The second charging unit 70 according to an embodiment of the present disclosure may include at least one of a second housing 80, a reception controller 90 and a reception coil 100.

The first charging unit 30 mounted on the mounting portion may form a magnetic field for charging and the second charging unit 70 may charge the battery 307 of the personal mobility vehicle 300 after receiving the magnetic field, thereby reducing occurrence of safety accidents due to electric shock.

The second housing 80 may be secured to a second coupling groove 306 provided on a lower surface of the footrest 305. A coupling space may be provided inside the second housing 80 and the second housing 80 may be mold of a non-metal or non-conductive material. The second housing 80 according to an embodiment may be made of a plurality of members, and may include a second housing body 82, a second core member 84 and a second cover member 86.

The second housing body 82 may be secured to a second coupling groove 306 provided in the footrest 305. The second housing body 82 may have a plate shape and secured to the second coupling groove 306 if necessary. The second housing body 82 may be molded of a material including an aluminum alloy with high thermal conductivity for heat radiation or an insulation material such as plastic.

The second core member 84 may be secured to the second housing body 82. The reception controller 90 may be disposed between the second core member 84 and the second housing body 84. The second core member 84 may include an aluminum alloy for heat radiation and may be molded of a material with high thermal conductivity. The second core member 84 may serve as a partition wall for portioning off a space in which the reception coil 100 is disposed. Accordingly, the magnetic field transmitted to the reception controller 90 may be blocked by the second core member 84, thereby preventing the reception controller 90 from damaging due to the magnetic field.

The second cover member 86 may be secured to the second core member 84, with the reception coil 100 disposed therebetween, and may be molded of plastic. In addition, the second cover member 86 may prevent the reception coil 100 from being exposed to the outside.

The reception controller 90 may be disposed inside the second housing 80. The reception controller 90 may include a control element configured to convert the transmitted magnetic field into electric power. The reception controller 90 may be formed by mounting a control element on a printed circuit board.

The reception coil 100 may be disposed inside the second housing 80 and connected with the reception controller 90. The second core member 84 may be provided between the reception coil 100 and the reception controller 90. A cable supplied power may connect the transmission coil 60 and the transmission controller 50 by passing through the second core member 84.

The reception coil may be disposed between the second core member 84 and the second cover member 86, and may be spirally wound. The reception coil 100 may have an area that is equal to or smaller than the area of the transmission coil 60. Accordingly, even if the second charging unit 70 including the reception coil 100 does not match the first charging unit 30, the possibility of the reception coil 100 being located inside the transmission coil 60 may increase so that wireless charging can be more rapidly and easily performed.

When charging the conventional personal mobility vehicle 300, the personal mobility vehicle 300 has to be collected and moved to a warehouse, and then charged so that there may be a problem of increased cost required for device damage and charging. However, charging may be performed together with the return of the personal mobility vehicle 300 according to the present disclosure so that device damage can be prevented and costs required for charging may be reduced.

Figure 18:
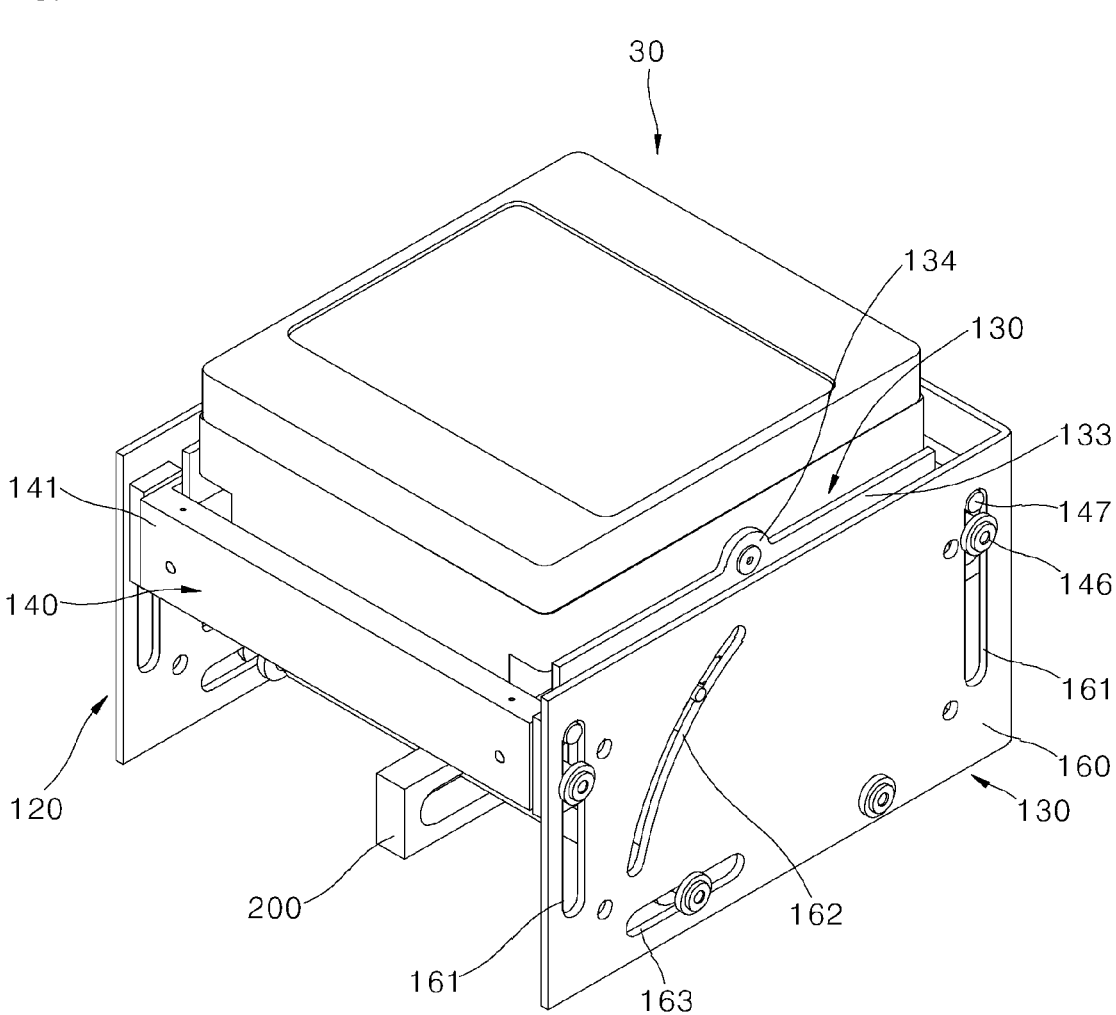
FIG. 18 is a perspective view showing a state where a first charging unit according to an embodiment of the present disclosure is mounted to a variable support part.
Figure 19:
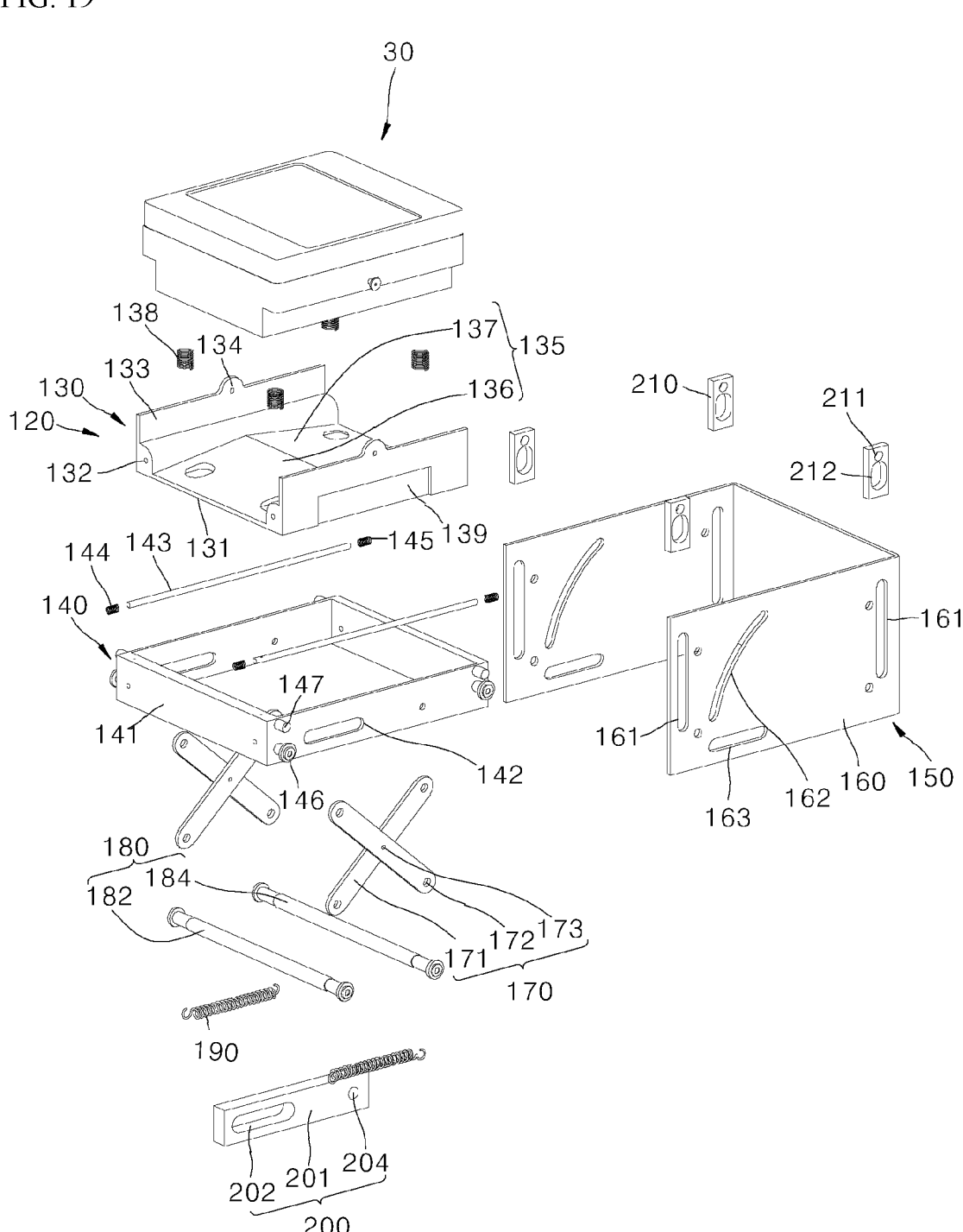
FIG. 19 is an exploded perspective view of a variable support part according to an embodiment of the present disclosure.

FIG. 18 is a perspective view showing a state where a first charging unit 30 according to an embodiment of the present disclosure is mounted to a variable support part 120. FIG. 19 is an exploded perspective view of a variable support part 120 according to an embodiment of the present disclosure.

As shown in FIGS. 18 and 19, the variable support part 120 may be modified in various embodiments within a technical feature of being secured to the frame part 20, while supporting the first charging unit 30, and moving the first charging unit 30 based on the position of the second charging unit 70. The variable support part 120 according to an embodiment of the present disclosure may include a first variable support part 120, a second variable support 140 and a third variable support 150.

The first variable support 130 may be modified in various embodiments within a technical feature of rotatably supporting the first charging unit 30. The first variable support 130 according to an embodiment may include at least one of a first body 131, a first side member 133, a stopper 135 and a restoring member.

Since the first variable support 130 provided in the variable support part 120 rotatably supports the first charging unit 30, the first charging unit 20 may be rotatable about a rotation support protrusion. The first variable support 130 may include at least one of a first body 131, a first side member 133, a stopper 135 and a buffer member 138.

The first body 131 may extend in a left-right direction, spaced apart a preset distance apart from the first charging unit 30. The first body 131 may have a plate or partition wall shape and the first side member 133 may be disposed on both sides of the first body 131.

The first side member 133 may extend upward from both sides of the first body 131 toward the first charging unit 30. The first side member 133 may have a plate shape and rotatably support a shaft provided in the first side member 133. Since the rotation support protrusions 134 provided in the first side member 133 rotatably support the shaft protruding from both sides of the first charging unit 30, the first charging unit 30 may rotate within a preset angle range.

The stopper 135 may have a shape protruding upward with respect to the first body 131, in contact with the first charging unit 30 rotating at a preset angle or more, and restrict the rotation of the first charging unit 30.

A longitudinal cross section of the stopper 135 according to an embodiment of the present disclosure is triangle-shaped. The stopper 135 may include a first inclined portion 135 and a second inclined portion 137. The first inclined portion 136 of the stopper 135 has a thickness getting gradually thinner toward the left from the center of the stopper 135. The second inclined portion 137 of the stopper 135 may have a thickness getting gradually thinner toward the right from the center of the stopper 135.

The buffer member 138 made of a coil spring may be disposed between the stopper 135 and the first charging unit 30. A plurality of buffer members 138 may be disposed between the first inclined portion 136 and the first charging unit 30. Also, a plurality of buffer members may be also disposed between the second inclined and the first charging unit 30. Accordingly, when the first charging unit 30 is rotated toward the first inclined portion 136 or toward the second inclined portion 137 by external force, the first charging unit 30 may be restored to its initial position by the restoring force of the buffer member 138 in a state of removing the external force. The initial position of the first charging unit 30 is a position extending horizontally from an upper end of the variable support part 120. The buffer member 138 may be disposed between the stopper 135 and the first charging unit 30 and reduce impact when the first charting unit 30 is rotated toward the stopper 135.

Meanwhile, a side groove 139 having a concave shape may be formed on a lateral surface of the first body 131. The side groove 139 may form the concave shape to avoid interference with a link unit 170, which will be described later, when the link unit 170 is operated. Accordingly, operational reliability of the variable support part 120 may be improved.

A guide hole 132 may be provided on each width-direction side of the first body and the guide hole may be a through-hole penetrating in a horizontal direction.

The second variable support 140 provided in the variable support part 120 may vary the position of the first charging unit 30 in a left-right direction (i.e., the horizontal direction). The second variable support 140 may be modified in various embodiments within a technical feature of being provided on the outside of the first variable support 130 and guide left-right direction movement of the first variable support 130. The second variable support 140 according to an embodiment of the present disclosure may at least one of a second body 141, a guide bar 143, a first elastic support portion 145, a first side protrusion 146 and a second side protrusion 147.

The second body 141 may have a shape covering lateral surfaces and a lower surface of the first variable support 130. The second body 141 may include a quadrangular frame surrounding an outer circumference of the first variable support 130. A side guide hole may be provided on the lateral surface of the second body 141 to form a hollow in the left-right direction.

The guide bar 143 may be secured to the second body 141 while passing through the first variable support 130 in a horizontal direction. Two guide bars 143 according to an embodiment of the present disclosure may be provided in parallel as a pair. The guide bar 143 may horizontally penetrate the guide hole 132 provided in the first variable support 130, and both ends of the guide bar 143 may secured to the second body 141.

Figure 20:
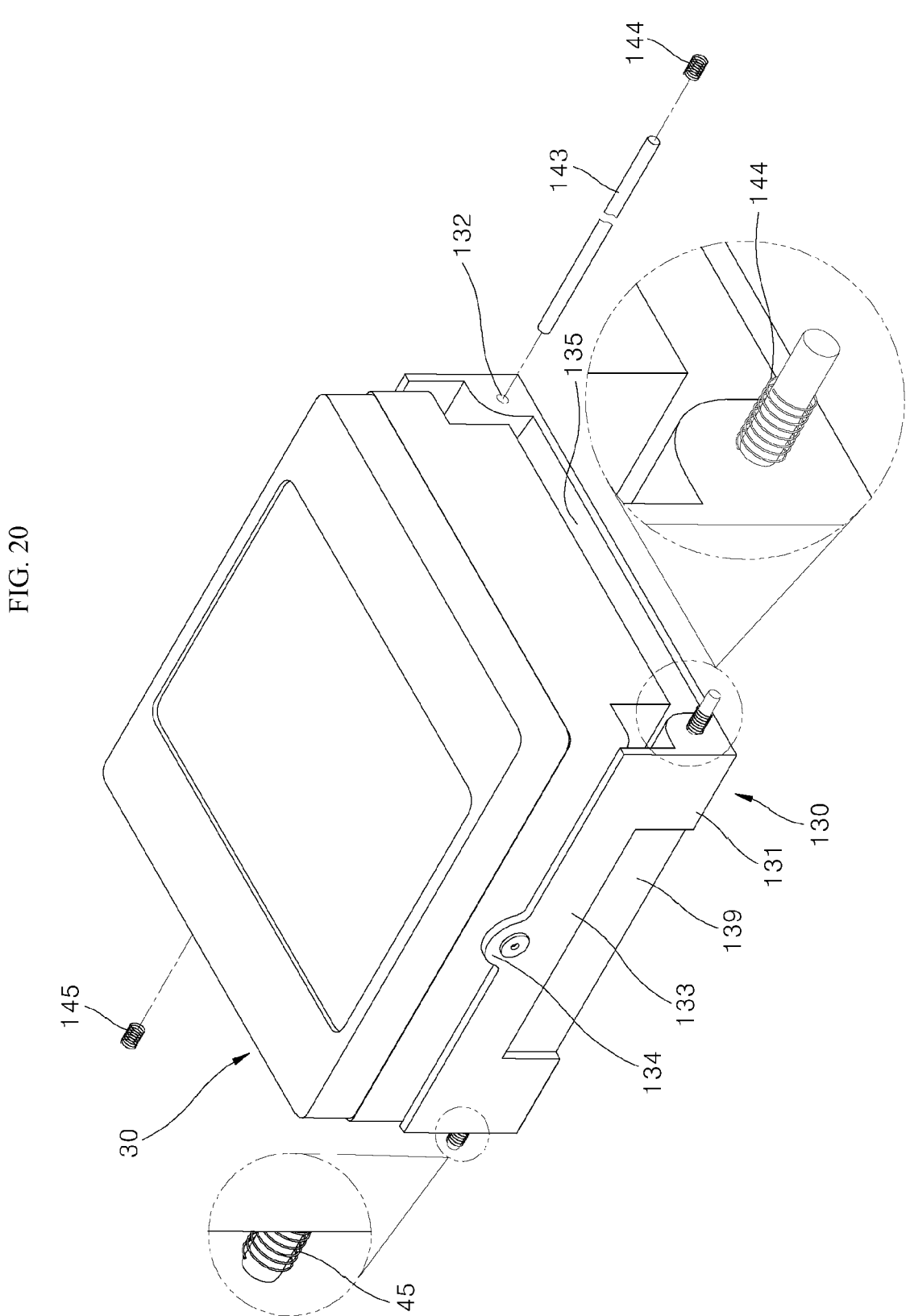
FIG. 20 is a perspective view showing a first variable support part according to an embodiment of the present disclosure.
Figure 21:
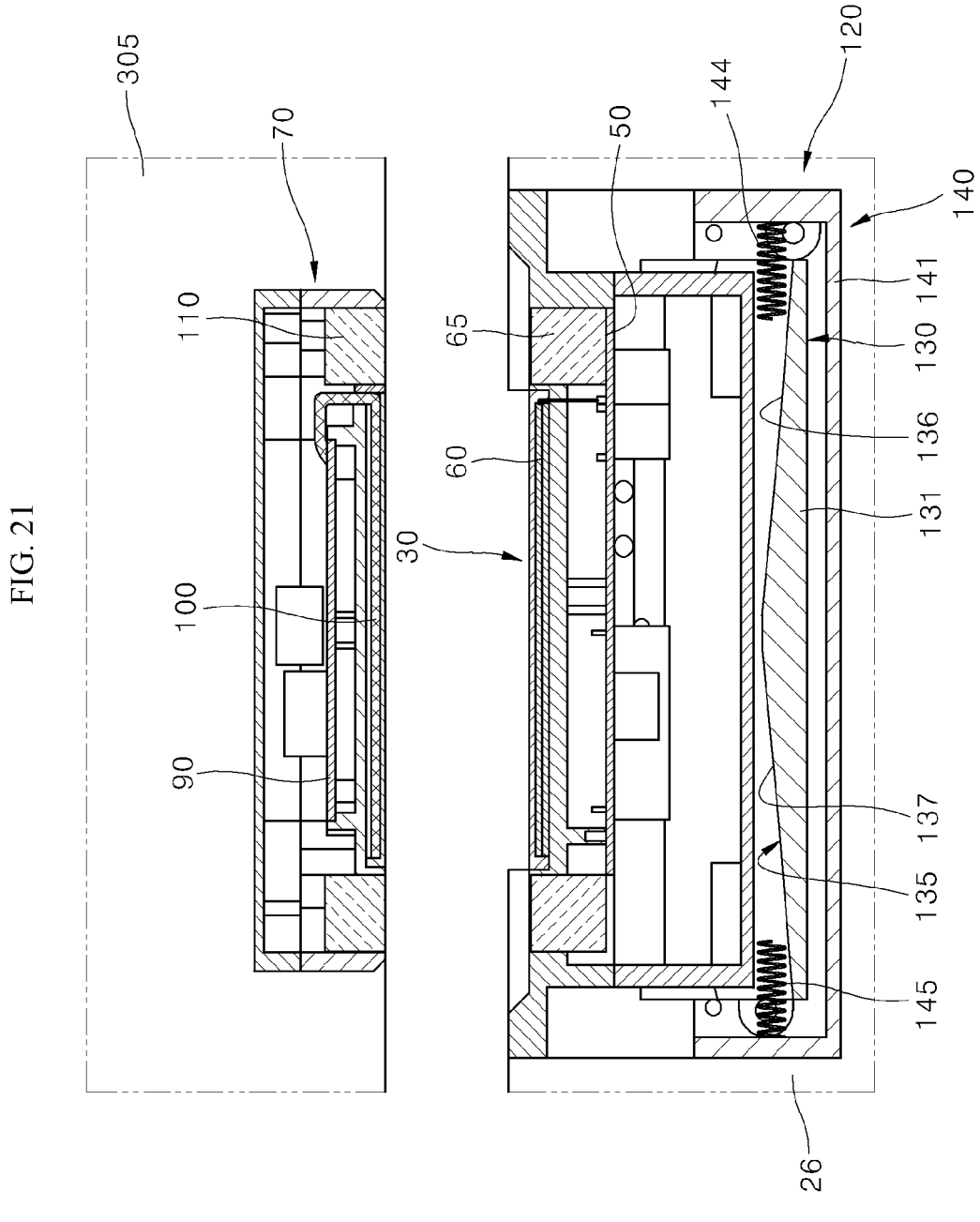
FIG. 21 is a sectional view showing a state where a first charging unit is mounted to a variable support part according to an embodiment of the present disclosure.

FIG. 20 is a perspective view showing a first variable support 130 according to an embodiment of the present disclosure. FIG. 21 is a sectional view showing a state where a first charging unit 30 is mounted to a variable support part according to an embodiment of the present disclosure.

As shown in FIGS. 20 and 21, the first elastic support portion 144 may be provided between one side of the first variable support 130 and the second body 141, and horizontally pressurize the first variable support 130. The second elastic support portion 145 may be provided between the other side of the first variable support 130 and the second body 141, and horizontally pressurize the first variable support 130.

The first elastic support 144 and the second elastic support 145 may be made of a coil spring or an elastic body. The elastic force of the first elastic support 144 and the elastic force of the second elastic support 145 may have the same value.

Meanwhile, the first side protrusion 146 and the second side protrusion 147 may have a projected shape and connected to a movable block and a third body 160, which will be described later.

As shown in FIG. 19, the third variable support 150 may be vertically moved to vary the position of the first charging unit 30. The third variable support 150 may be modified in various embodiments within a technical feature of being provided on the outside of the second variable support 140 and guide vertical movement of the second variable support 140. The third variable support 150 according to an embodiment of the present disclosure may include at least one of a third body 160, a link part 170, a shaft part 180, an elastic member 190, a movement guide part 200 and a moveable block.

The third body 160 may be provided on the outside of the second variable support 140 and secured to a mounting portion. The third body 160 may be modified in various embodiments within a technical feature of being provided on the outside of each lateral surface of the second body 141. The third body 160 according to an embodiment of the present disclosure may be a plate having a ⊂-shape, and have a plurality of guide grooves formed on a lateral surface facing the second body 141.

A first guide groove 161 may form a hollow hole on a lateral surface of the third body 160, and disposed in parallel to a vertical direction. A second guide groove 162 may form a curved hole on the lateral surface of the third body 160. A third guide groove 163 may form a hole horizontally extending from the third body 160.

The link part 170 may be modified in various embodiments within a technical feature of connecting the third body 160 with the second variable support 140 and varying a link shape thereof due to vertical movement of the second variable support 140. The link unit 170 according to an embodiment of the present disclosure may include a third link 171, a second link 172 and a link shaft 173.

The first link 171 may linearly extend. The second link 172 may be rotatably connected to the first link 171, while crossing the first link 171. The first link 171 and the second link 172 may be disposed in an 'X' shape. A portion where the first link 171 and the second link 172 intersect may be rotatable by the link shaft 173. One side of the first link 171 and one side of the second link 172 may be connected to the shat 180.

The shaft part 180 may connect the link unit 170 disposed on both lateral surfaces of the second variable support 140 with each other. The shaft part 180 may have a rod shape and extend in a width direction of the second variable support 140. The shaft part 180 according to an embodiment of the present disclosure may include a first shaft 182 and a second shaft 184. The second shaft 184 may be disposed below the first shaft 182. The shafts may be disposed in parallel. The first link 171 may be connected to the first shaft 182 and the second link 172 may be connected to the second shaft 184.

The first shaft 182 and the second shaft 184 may be connected to each other by the elastic member 190. Accordingly, when a distance between the first shaft 182 and the second shaft 184 is greater than a preset distance, the distance between the first shaft 182 and the second shaft 184 may be restored to the preset distance by the restoring force of the elastic member 190. A coil spring may be used as the elastic member 190 according to an embodiment.

The movement guide part 200 may be disposed inside the third body 160 and include holes to be connected to the first shaft 182 and the second shaft 184. In addition, the movement guide part 200 may be modified in various embodiments within a technical feature of guiding vertical movement of the first shaft 182. The movement guide part 200 according to an embodiment may include a movement guide body 201 and an operation guide hole 202 and a fixing hole 204.

The movement guide body 201 may have block shape extending in a vertical direction, and may include an operation guide hole 202 and a fixing hole 204 that are provided inside the movement guide body 201. The operation guide hole 202 may be a shape of a hollow extending in a left-right direction so that the first shaft 182 may be disposed in the operation guide hole 202. The fixing hole 204 may be provided in a side area with respect to the operation guide hole 202 so that the second shaft 184 may be disposed in the fixing hole 204.

Figure 22:
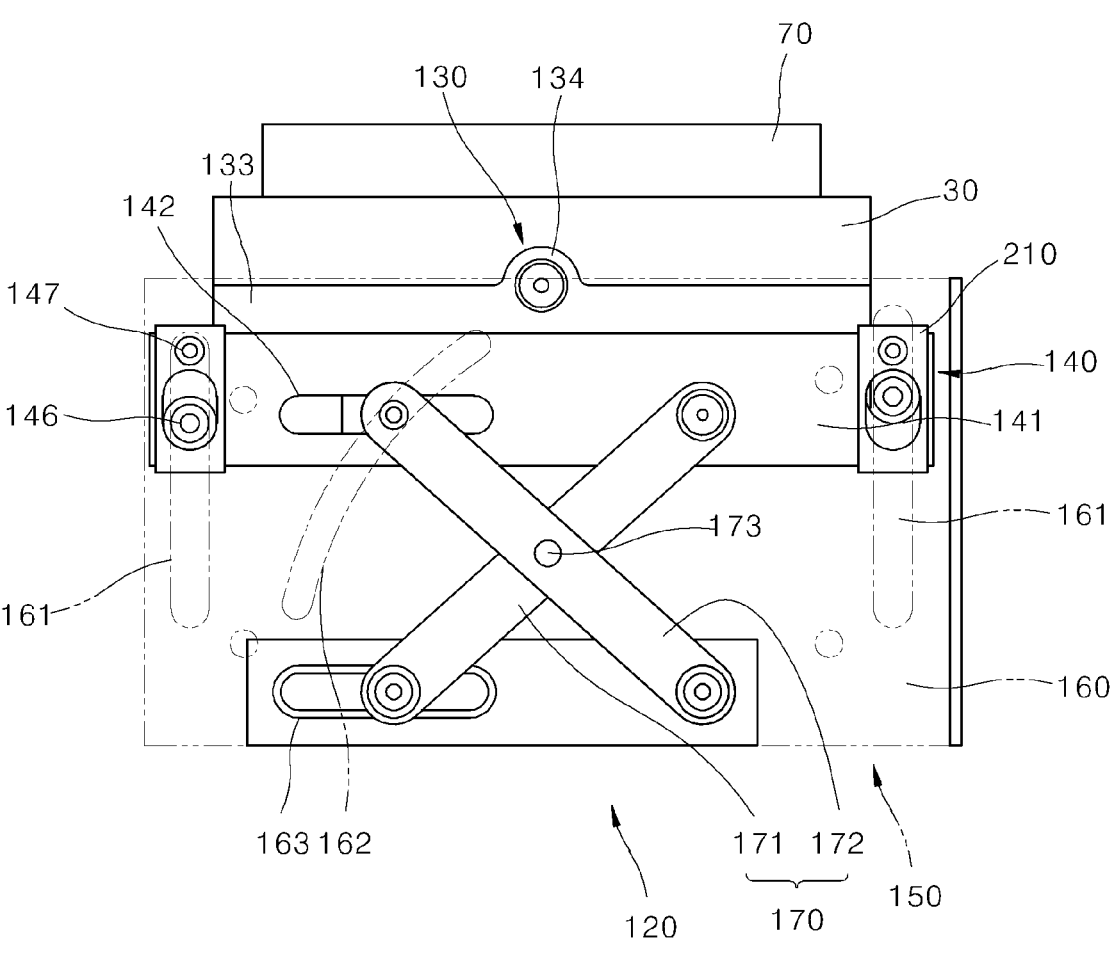
FIG. 22 is a view showing a connection state of a link unit according to an embodiment of the present disclosure.
Figure 23:
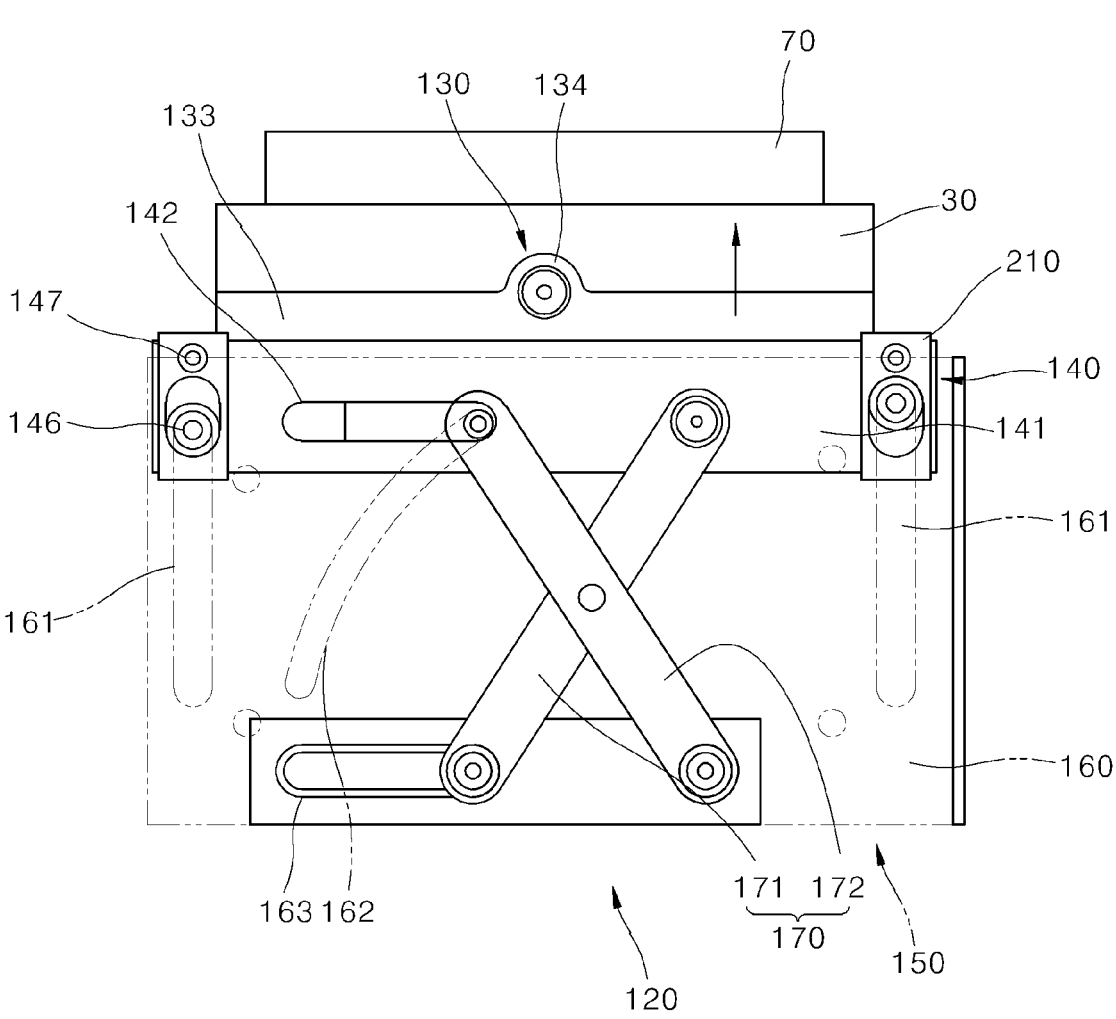
FIG. 23 is a view showing a link unit in a state where a first variable support part according to an embodiment of the present disclosure is moving upward.

FIG. 22 is a view showing a connection state of a link part 170 according to an embodiment of the present disclosure. FIG. 23 is a view showing a link part 170 in a state where a first variable support 130 according to an embodiment of the present disclosure is moving upward.

As shown in FIGS. 19, 22 and 23, the installation of the link part 170 and the shaft part 180 will be described. After an end of the first shaft 182 penetrates the first link 171, the first shaft 182 may be positioned in the third guide groove 163. The first shaft 182 disposed in the third guide groove 163 may be horizontally installed by penetrating the operation guide groove provided in the movement guide part 200. Accordingly, the first shaft may be movable in the left-right direction along the third guide groove 163 and the operation guide groove.

After an end of the second shaft 184 penetrates the second link 172, the second shaft 184 may be coupled to the third body 160. The second shaft 184 may be horizontally installed by penetrating the fixing hole 204 provided in the movement guide part 200, to restrict the movement of the second shaft.

A lower area of the first link 171 may be connected to the first shaft 182 and an upper area thereof may be rotatably connected to a lateral surface of the second body 141. An upper area of the second link 172 may be provided at a position facing the second guide groove 162 of the third body 160. An auxiliary connection protrusion may have both sides disposed inside the side guide hole 142 provided on the lateral surface of the second body 141 and the second guide groove 162, respectively. Accordingly, when the upper area of the second link 172 is moved along the second guide groove 162, the second body 141 may be moved toward the upper area or the lower area of the third body 160.

At this time, since the first side protrusion 146 protruding from the lateral surface of the second body 141 is disposed inside the first guide groove 161, the vertical movement of the second variable support 140 may be stably performed.

The moveable block 210 may be disposed between the second body 141 and the third body 160, and secured to the second side protrusion 147. The moveable block 210 according to an embodiment of the present disclosure may be a block having a rectangular parallelepiped shape, and include a first block hole in which the second side protrusion 147 is inserted and a second block hole in which the first side protrusion 146 is inserted.

The charging device including the personal mobility vehicle 300 according to an embodiment of the present disclosure may provide a docking structure configured to control the vertical, horizontal and rotational directions. Accordingly, the first charging unit 30 may be moved based on an installation angle and an installation position of the second charging unit 70 installed in each of various personal mobility vehicle models, thereby improving docking stability and charging efficiency.

As shown in FIGS. 1 and 2, the personal mobility vehicle 300 may include a handle 301 provided with an input of a user's manipulation and a rotary column 302 extending downward from the handle 301 and rotatable together with handle 301.

A front wheel 303 may be rotatably supported below the handle 301 and a rear wheel 304 may be rotatably coupled to a footrest 305 connected with the rotary column 302. The wheel provided in the personal mobility vehicle 300. The wheel provided in the personal mobility vehicle 300 may include the front wheel 303 and the rear wheel 304, and further include an auxiliary wheel if necessary.

At least one of the front wheel 303 and the rear wheel 304 may be rotatable by receiving power from a motor. The motor may be supplied with electric power through a battery 307 provided in the footrest 305. The battery 307 may be connected to the second charging unit 70 to receive power. The second charging unit 70 may be detachably coupled to a lower area of the footrest 305.

The charging device 1 for the personal mobility vehicle may be installed at a fixed position so that the personal mobility vehicle 300 may be easily withdrawn and returned. In addition, the first charging unit 30 and the second charging unit 70 may be wirelessly charged by using a magnetic field, thereby preventing safety accidents due to electric leakage or electric shock.

An electric kickboard may be taken as an example as the personal mobility vehicle 300 but the present disclosure is not limited thereto. Other types of mobility vehicles may be taken as the personal mobility vehicle 300 according to the present disclosure.

Hereinafter, an operational state of the charging device 1 for the personal mobility vehicle according to an embodiment of the present disclosure will be described in detail, referring to the accompanying drawings.

Figure 7:
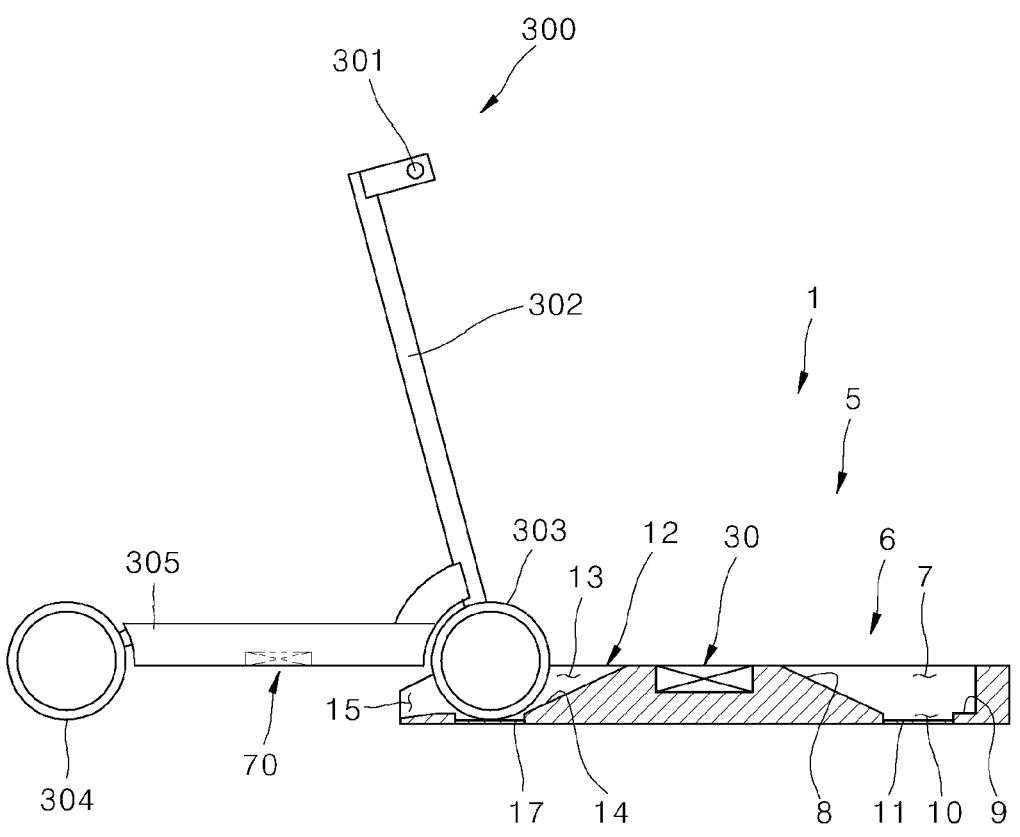
FIG. 7 is a front view showing a state where a front wheel of a personal mobility vehicle is introduced to a second support.

FIG. 7 is a front view showing a state where a front wheel 303 of a personal mobility vehicle 300 is introduced to a second support 12. As shown in FIG. 7, the personal mobility vehicle 300 is moved toward the support part 5 to store and charge the personal mobility vehicle 300. The front wheel 303 of the personal mobility vehicle 300 in which the second charging unit 70 is disposed is moved inside the second support 12 through the entrance portion 15 of the second support 12.

Figure 8:
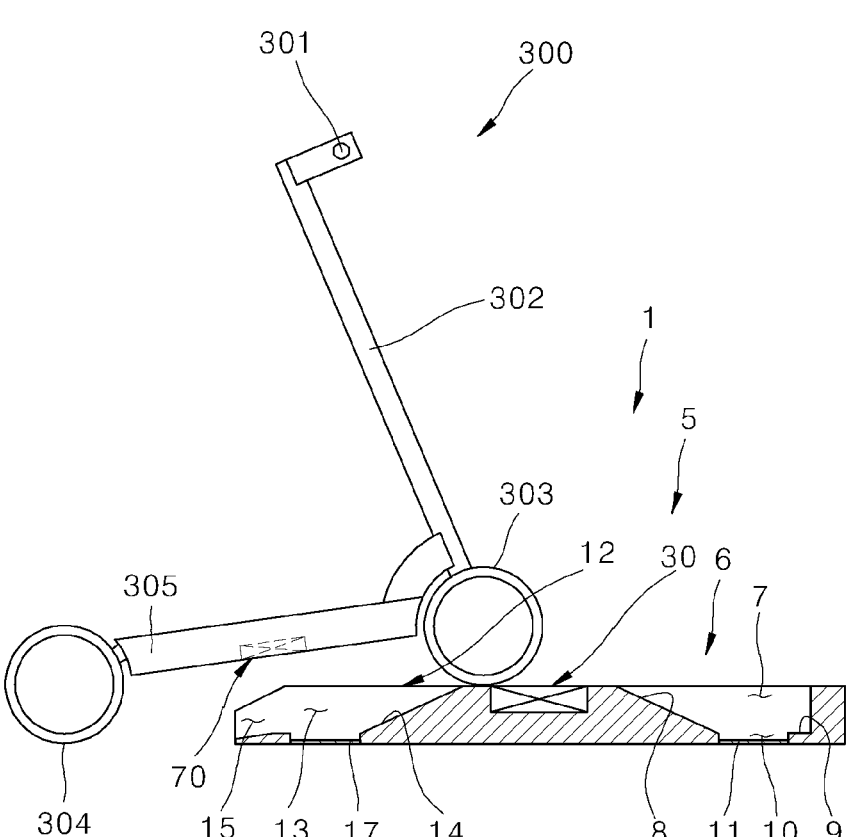
FIG. 8 is a front view showing a state where a front wheel of a personal mobility vehicle according to an embodiment of the present disclosure moves over a connection frame.

FIG. 8 is a front view showing a state where a front wheel 300 of a personal mobility vehicle 300 according to an embodiment of the present disclosure moves over a connection frame 26. As shown in FIG. 8, the front wheel 303 of the personal mobility vehicle 300 is inclinedly moved upward along the second inclined guide 14 and then moved to an upper area of the connection frame 26.

Figure 9:
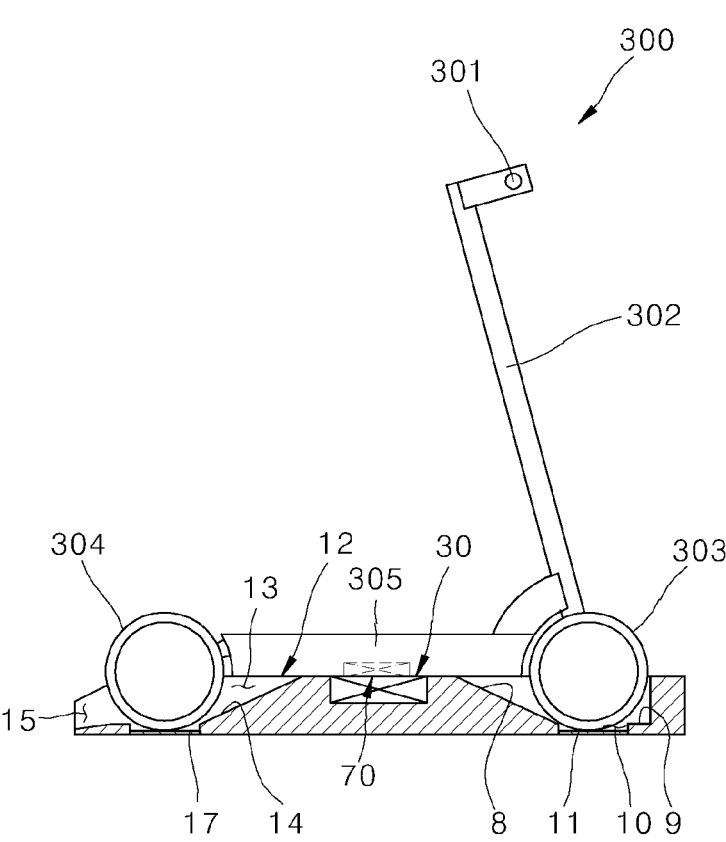
FIG. 9 is a front view showing a state where a front wheel of a personal mobility vehicle according to an embodiment of the present disclosure is seated on a first support.

FIG. 9 is a front view showing a state where a front wheel 303 of a personal mobility vehicle 300 according to an embodiment of the present disclosure is seated on a first variable support 130. As shown in FIG. 9, the front wheel 303 of the personal mobility vehicle 300 moved downward along the first inclined guide 8 is located inside the first support groove 7 in an upright state so that storing and charging may be performed in a state where the personal mobility vehicle 300 stands at an upright pose.

The rear wheel 304 of the personal mobility vehicle 300 is also seated inside the second support 12 so that the rear wheel 304 of the personal mobility vehicle 300 may be supported in a state of standing at an upright pose together with the front wheel 303. The second charging unit 70 is positioned in an upper area of the first charging unit 30 so that the magnetic field generated in the first charging unit 30 may be transmitted to the second charging unit 70 to charge the battery 307.

Figure 10:
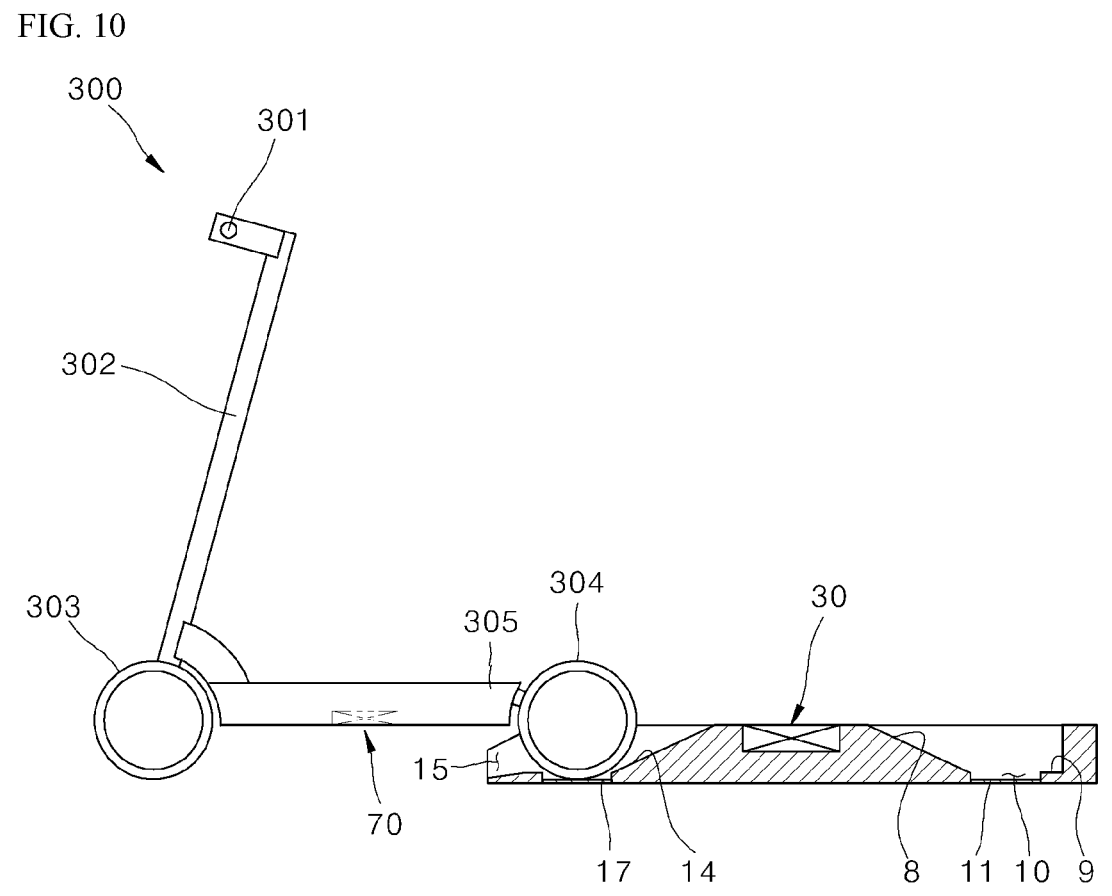

FIG. 10 is a front view showing a state where a rear wheel 304 of a personal mobility vehicle 300 is introduced to a second support 12. As shown in FIG. 10, the rear wheel 304 of the personal mobility vehicle 300 may enter the support part 5. The rear wheel 304 of the personal mobility vehicle 300 in which the second charging unit 70 is disposed may be moved inside the second support 12 through the entrance portion 15 of the second support 12.

Figure 11:
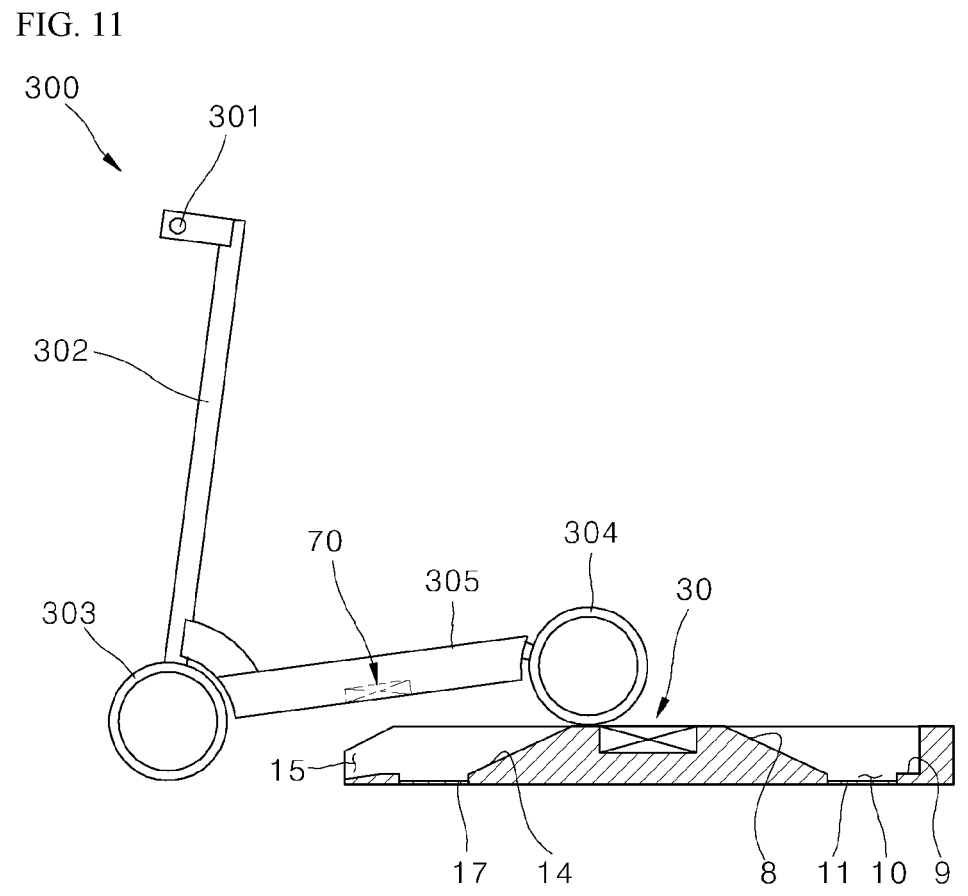

FIG. 11 is a front view showing a state where a rear wheel 304 of a personal mobility vehicle 300 according to an embodiment of the present disclosure moves over a connection frame 26. As shown in FIG. 11, the rear wheel 304 of the personal mobility vehicle 300 is inclinedly moved upward through the second inclined guide 14 and then moved to an upper area of the connection frame 26.

Figure 12:
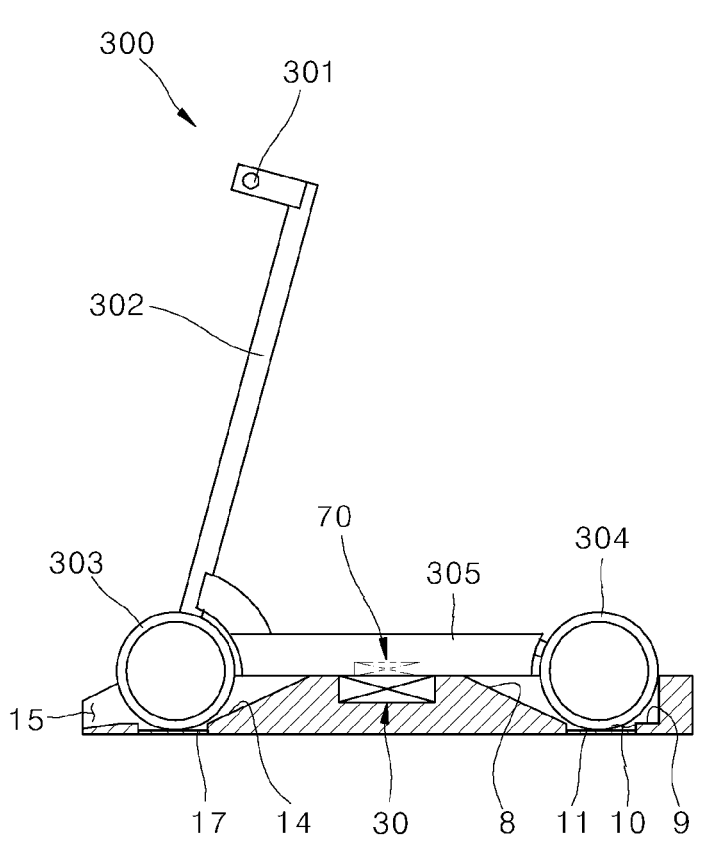
FIG. 12 is a front view showing a state where a rear wheel of a personal mobility vehicle according to an embodiment of the present disclosure is seated on a first support.

FIG. 12 is a front view showing a state where a rear wheel 304 of a personal mobility vehicle 300 according to an embodiment of the present disclosure is seated on a first support 6. As shown in FIG. 12, the rear wheel 304 of the personal mobility vehicle 300 moved downward along the first inclined guide 8 may be disposed inside the first support groove 7 in a state of standing at an upright pose so that the personal mobility vehicle 300 may be stored and charged in a state of standing at the upright pose. Since the front wheel 303 of the personal mobility vehicle 300 is also seated inside the second support 12, the front wheel 303 of the personal mobility vehicle 300 may be also supported in a state of standing at the upright pose together with the rear wheel 304. The second charging unit 70 is located above the first charging unit 30 so that the magnetic field generated in the first charging unit 30 may be transmitted to the second charging unit 70 to charge the battery 307.

Figure 13:
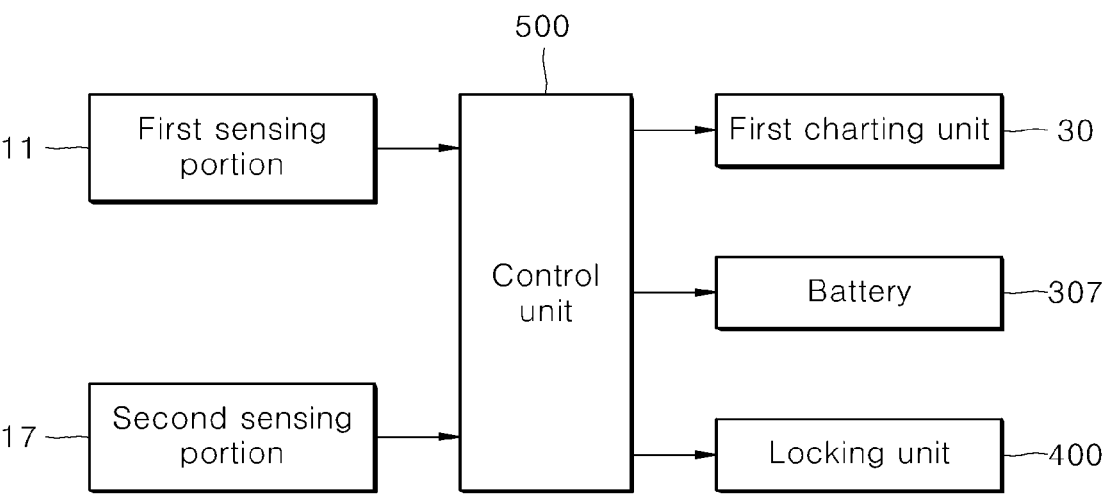
FIG. 13 is a block view of a charging device for a personal mobility vehicle according to an embodiment of the present disclosure.

FIG. 13 is a block view of a charging device 1 for a personal mobility vehicle according to an embodiment of the present disclosure. As shown in FIG. 13, the first sensing portion 11 and the second sensing portion 17 for sensing whether the front wheel 303 and the rear wheel 304 of the personal mobility vehicle 300 are seated inside the support part 5 may sent a measured value. The control unit 500 may operate the first charging unit 30, in a state where both the first sensing portion 11 and the second sensing portion 17 have sensed the seated wheels, so that the control unit 500 may charge the battery 307 of the personal mobility vehicle 300.

The control unit 500 may receive the value of the wheel sensing that is measured by the first sensing portion 11 and the second sensing portion 17 and perform a function of identify a specific kickboard model based on the measured value. Accordingly, the control unit 500 may allow the first charging unit 30 to operate only in a specific model of the personal mobility vehicle 300 mounted on the support part 5.

Figure 14:
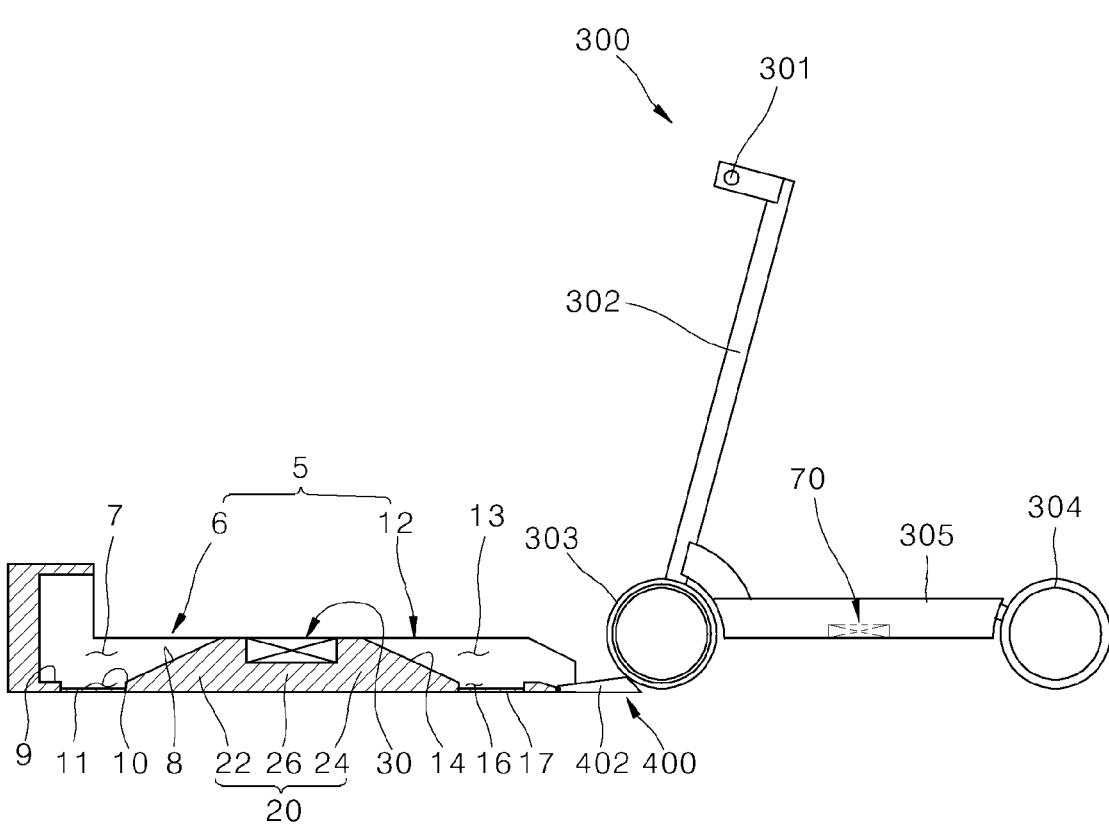
FIG. 14 is a front view showing a personal mobility vehicle according to an embodiment of the present disclosure is located in front of a locking unit.

FIG. 14 is a front view showing a personal mobility vehicle 300 according to an embodiment of the present disclosure is located in front of a locking unit 400. As shown in FIG. 14, the front wheel 303 of the personal mobility vehicle 300 is moved toward the second support 12 through an upper surface of a locking plate 402.

Figure 16:
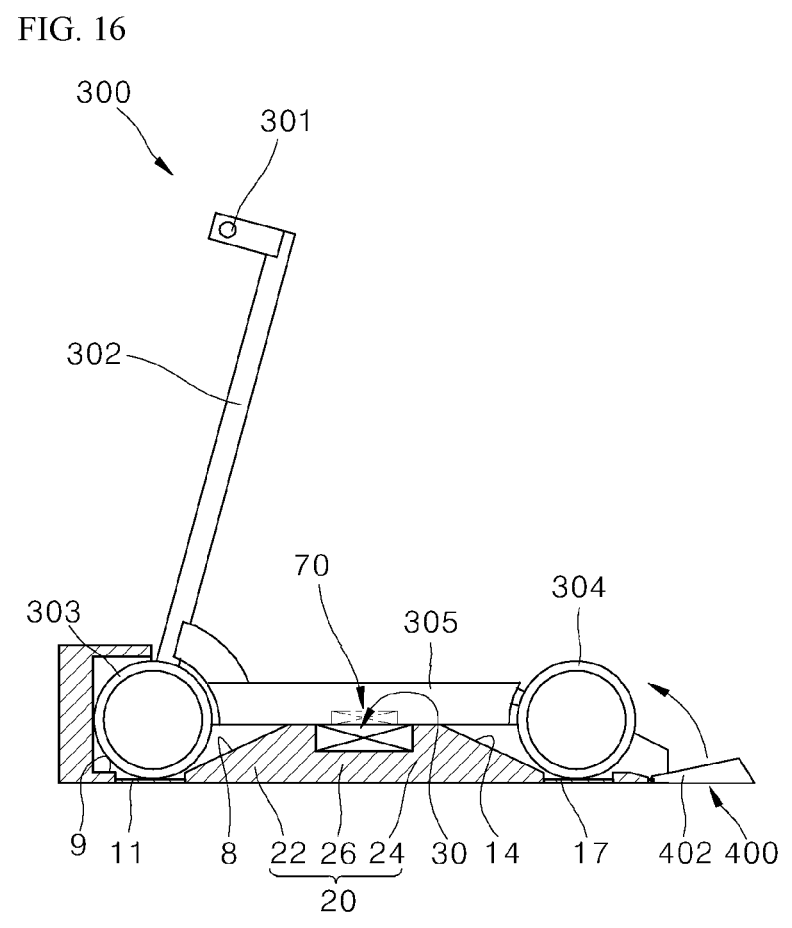

FIG. 16 is a front view showing a state where a personal mobility vehicle 300 according to an embodiment of the present disclosure is seated on a support portion after riding over a locking unit 400. As shown in FIG. 16, the front wheel 303 of the personal mobility vehicle 300 is located inside the first support 6 and the rear wheel 304 is located inside the second support 12. Accordingly, the first sensing portion 11 may sense the front wheel 303 and the second sensing portion 17 may sense the rear wheel 304.

Figure 17:
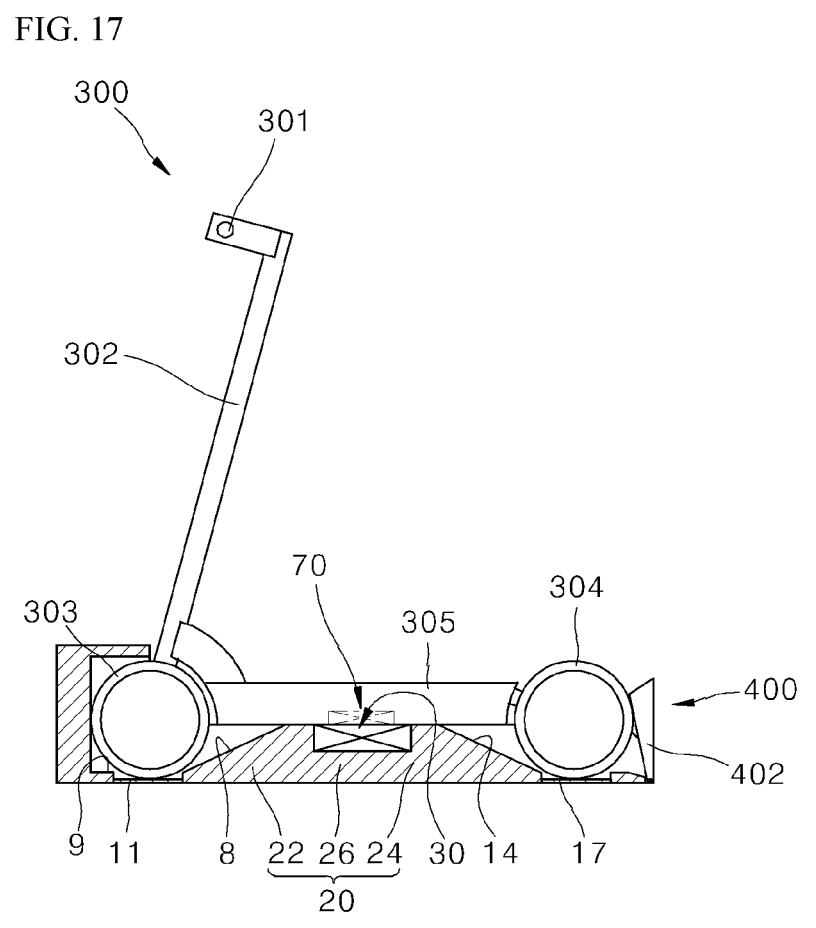

FIG. 17 is a view showing a state where a locking unit 400 according to an embodiment of the present disclosure is operated to restrict movement of a personal mobility vehicle 300. As shown in FIGS. 13 and 17, when the personal mobility vehicle 300 is seated on the support part 5, the first sensing portion 11 and the second sensing portion 17 sense the wheels of the personal mobility vehicle 300 seated in the support part 5, and transmit a signal to the control unit 500.

The control unit 500 may receive the state where the wheels have been seated from the first sensing portion 11 and the second sensing portion 17, and operate the locking unit 400. The locking unit 400 may be operated by a control signal of the control unit 500 so that the entrance portion 15 of the second support 12 may be closed by the locking plate 402. Accordingly, the movement of the personal mobility vehicle 300 may be restricted to prevent shaking and moving of the personal mobility vehicle 300, thereby easily and rapidly performing energy transmission between the first charging unit 30 and the second charging unit 70.

In addition, as shown in FIGS. 18 and 19, even if the position of the first charging unit 30 does not exactly matches and the position of the second charging unit 70 disposed above the first charging unit 30 when the variable support part 120 is additionally provided in the lower area of the first charging unit 30, the position of the first charging unit 30 may be changed by the operation of the variable support part 120. Accordingly, the first charging unit 30 and the second charging unit 70 may maintain a facing state, thereby improving charging efficiency.

As described above, in the charging device 1 for the personal mobility vehicle according to the embodiment of the present disclosure, the personal mobility vehicle 300, which is an electric kickboard, may be mounted inside the support part 5 in a state of standing at an upright pose. The first charging unit 30 may be disposed in the frame part 20 connecting the support part 5 and the second charging unit 70 may be disposed in the lower area of the personal mobility vehicle 300. Accordingly, mounting and charging may be performed at the same time.

Meanwhile, the second charging unit 70 is disposed at the center of the footrest 305. Accordingly, even when the personal mobility vehicle 300 is mounted in the support part 5 by moving forward or rearward, the first charging unit 30 and the second charging unit 70 may face each other, thereby easily performing wireless charging.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. A charging device for a personal mobility device, the charging device comprising:
   a support part comprising a groove configured to seat at least one wheel of the personal mobility device;
   a frame part connected to the support part;
   a first charging unit disposed in the frame part and configured to generate a magnetic field toward the personal mobility device when the personal mobility device is seated in the support part, the magnetic field for wireless charging the personal mobility device,
   wherein a second charging unit is mounted to the personal mobility device and configured to charge a battery provided in the personal mobility device by converting the magnetic field into electricity,
   wherein the charging device further comprises a variable support part secured to the frame part and configured to support and move the first charging unit relative to a position of the second charging unit, and wherein the variable support part comprises:
   a first variable support rotatably arranged to support the first charging unit;
   a second variable support disposed on an outside of the first variable support and arranged to guide a horizontal movement of the first variable support; and
   a third variable support disposed on an outside of the second variable support and coupled to the frame part, the third variable support configured to guide a vertical movement of the second variable support.

2. The charging device for the personal mobility device of claim 1, wherein the support part comprising the groove configured to seat at least one wheel of the personal mobility device comprises:
   a first support comprising a first groove configured to seat a first wheel of the personal mobility device; and
   a second support comprising a second groove configured to seat a second wheel of the personal mobility device.

3. The charging device for the personal mobility device of claim 2, wherein the first groove has a shape arranged to cover a lower area of the first wheel, and wherein the first support further comprises:
   a first inclined guide disposed on a first side of the first groove and forming an inclined surface toward a lower area of the first groove; and
   a restricting portion disposed on a second side of the first groove, opposite to the first side, and arranged to protrude upward so as to restrict movement of the first wheel when the first wheel is situated in the first groove.

4. The charging device for the personal mobility device of claim 3, wherein the first support further comprises:
   a first sensing portion provided between the first inclined guide and the restricting portion and configured to determine whether the first wheel is seated in the first groove.

5. The charging device for the personal mobility device of claim 2, wherein the second groove has a shape that guides movement of the second wheel into the second groove, wherein the second support further comprises a second inclined guide disposed on a first side of the second groove and forming an inclined surface toward an upper area from a lower area of the second groove, and wherein a second side of the second groove comprises an entrance portion having an open shape arranged to receive the second wheel.

6. The charging device for the personal mobility device of claim 5, wherein the second support further comprises,
   a second sensing portion disposed between the second inclined guide and the entrance portion and configured to sense whether the second wheel is seated in the second groove.

7. The charging device for the personal mobility device of claim 2, wherein the frame part comprises:
   a first frame protruding upward from an installation surface of the personal mobility device and covering an outer circumference of the first support;
   a second frame protruding upward from the installation surface and covering an outer circumference of the second support; and
   a connection frame protruding upward from the installation surface and connecting the first frame and the second frame with each other.

8. The charging device for the personal mobility device of claim 1, wherein the first charging unit comprises:
   a first housing secured to the frame part;
   a transmission controller disposed inside the first housing; and
   a transmission coil disposed inside the first housing and connected with the transmission controller.

9. The charging device for the personal mobility device of claim 8, wherein the first housing comprises:
   a first housing body secured to a first coupling groove provided in the frame part;
   a first core member secured to the first housing body, with the transmission controller interposed therebetween; and
   a first cover member secured to the first core member, with the transmission coil interposed therebetween.

10. The charging device for the personal mobility device of claim 1, wherein the second charging unit comprises:
   a second housing secured to a lower area of the personal mobility device;
   a reception controller disposed inside the second housing; and a reception coil disposed inside the second housing and connected with the reception controller.

11. The charging device for the personal mobility device of claim 10, wherein the second housing comprises:
    a second housing body secured to a second coupling groove provided in a footrest of the personal mobility device;
    a second core member secured to the second housing body, with the reception controller interposed therebetween; and
    a second cover member secured to the second core member, with the reception coil interposed therebetween.

12. A charging device for a personal mobility device comprising,
    a support part comprising a groove configured to seat at least one wheel of the personal mobility device;
    a frame part connected to the support part;
    a locking unit rotatably coupled to the frame part and arranged to close an entrance portion of the support part after the at least one wheel is positioned inside the support part;
    a first charging unit disposed in the frame part and configured to generate a magnetic field toward the personal mobility device when the personal mobility device is seated in the support part, the magnetic field for wireless charging the personal mobility device,
    wherein a second charging unit is mounted to the personal mobility device and configured to charge a battery provided in the personal mobility device by converting the magnetic field into electricity,
    wherein the charging device further comprises a variable support part secured to the frame part and configured to support and move the first charging unit relative to a position of the second charging unit, and wherein the variable support part comprises:
    a first variable support rotatably arranged to support the first charging unit;
    a second variable support disposed on an outside of the first variable support and arranged to guide a horizontal movement of the first variable support; and
    a third variable support disposed on an outside of the second variable support and coupled to the frame part, the third variable support configured to guide a vertical movement of the second variable support.

13. The charging device for the personal mobility device of claim 12, wherein the locking unit comprises:

a locking plate rotatably coupled to the frame part and arranged to close the entrance portion when the locking plate is rotated to a closed position; and
    a cylinder having one side rotatably coupled to the frame part and a second side rotatably coupled to the locking plate, the cylinder having a length that varies based on movement of a rod member.

14. The charging device for the personal mobility device of claim 12, wherein the second variable support comprises:
    a second body disposed with a shape surrounding lateral surfaces and a rear surface of the first variable support;
    a guide bar secured to the second body for horizontally penetrating the first variable support;
    a first elastic support disposed between one side of the first variable support and the second body; and
    a second elastic support disposed between a second side of the first variable support and the second body,
    wherein the first elastic support and the first elastic support are configured to pressurize the first variable support.

15. The charging device for the personal mobility device of claim 12, wherein the third variable support comprises:
    a third body disposed on an outside of the second variable support and secured to the frame part;
    a link part connecting the third body with the second variable support and having a link shape that varies based on vertical movement of the second variable support; and
    a shaft part connected to the link part.

16. The charging device for the personal mobility device of claim 12, wherein the support part configured to seat at least one wheel of the personal mobility device comprises:
    a first support comprising a first groove configured to seat a first wheel of the personal mobility device; and
    a second support comprising a second groove configured to seat a second wheel of the personal mobility device.

17. The charging device for the personal mobility device of claim 16, wherein the first support further comprises:
    a first sensing portion disposed inside the first support and configured to sense whether the whether the first wheel is seated in the first groove.

18. The charging device for the personal mobility device of claim 16, wherein the second support further comprises:
    a second sensing portion disposed inside the second support and configured to sense whether the whether the second wheel is seated in the second groove.

* * * * *